United States Patent
Bontu et al.

(10) Patent No.: US 9,699,740 B2
(45) Date of Patent: *Jul. 4, 2017

(54) PACKET DELAY OPTIMIZATION IN THE UPLINK OF A MULTI-HOP COOPERATIVE RELAY-ENABLED WIRELESS NETWORK

(71) Applicant: BlackBerry Limited, Waterloo (CA)

(72) Inventors: Chandra Sekhar Bontu, Nepean (CA); Yongkang Jia, Ottawa (CA); Amin Mobasher, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/246,103

(22) Filed: Aug. 24, 2016

(65) Prior Publication Data
US 2016/0366651 A1 Dec. 15, 2016

Related U.S. Application Data

(63) Continuation of application No. 13/985,516, filed as application No. PCT/CA2011/050099 on Feb. 17, 2011, now Pat. No. 9,445,284.

(51) Int. Cl.
*H04L 12/26* (2006.01)
*H04W 52/24* (2009.01)
(Continued)

(52) U.S. Cl.
CPC ......... *H04W 52/241* (2013.01); *H04L 1/0015* (2013.01); *H04L 1/0033* (2013.01);
(Continued)

(58) Field of Classification Search
CPC ... H04W 52/241; H04W 24/08; H04W 24/02; H04W 16/26; H04W 84/047;
(Continued)

(56) References Cited

U.S. PATENT DOCUMENTS 7,643,793 B2   1/2010   Park et al.
7,720,020 B2   5/2010   Larsson
(Continued)

FOREIGN PATENT DOCUMENTS

CN   101128999 A   2/2008
CN   101361296 A   2/2009
(Continued)

OTHER PUBLICATIONS

3GPP TR 36.814 V9.0.0; 3rd Generation Partnership Project; Techincal Specification Group Radio Access Network; Evolved Universal Terrestrial Radio Access (E-UTRA); Further Advancements for E-UTRA Physical Layer Aspects; Release 9; Mar. 2010; 104 pages.
(Continued)

*Primary Examiner* — Brian O'Connor
(74) *Attorney, Agent, or Firm* — Conley Rose, P.C.; J. Robert Brown, Jr.; Albert A. Abbou

(57) ABSTRACT

A method for communication in a wireless network is provided. The method includes a relay node receiving a data packet and determining whether to transmit the packet without performing error checking.

20 Claims, 16 Drawing Sheets

(51) Int. Cl.

| | |
|---|---|
| *H04L 1/00* | (2006.01) |
| *H04L 1/20* | (2006.01) |
| *H04W 16/26* | (2009.01) |
| *H04W 24/02* | (2009.01) |
| *H04W 24/08* | (2009.01) |
| *H04L 1/18* | (2006.01) |
| *H04W 84/04* | (2009.01) |

(52) U.S. Cl.
CPC .............. *H04L 1/1887* (2013.01); *H04L 1/20* (2013.01); *H04L 1/206* (2013.01); *H04W 16/26* (2013.01); *H04W 24/02* (2013.01); *H04W 24/08* (2013.01); *H04L 1/1812* (2013.01); *H04L 2001/0097* (2013.01); *H04W 84/047* (2013.01)

(58) Field of Classification Search
CPC ..... H04L 1/0033; H04L 1/206; H04L 1/0015; H04L 1/1887; H04L 1/20; H04L 1/1812; H04L 2001/0097
See application file for complete search history.

(56) References Cited

U.S. PATENT DOCUMENTS

| | | |
|---|---|---|
| 8,155,049 B2 | 4/2012 | Mow et al. |
| 8,265,566 B2 | 9/2012 | Golitschek |
| 8,295,263 B1 | 10/2012 | Chen et al. |
| 8,351,334 B2 | 1/2013 | Larsson et al. |
| 8,416,731 B2 | 4/2013 | Bontu et al. |
| 8,543,128 B2 | 9/2013 | Jen |
| 8,588,801 B2 | 11/2013 | Gorokhov et al. |
| 8,792,412 B2 | 7/2014 | Bontu et al. |
| 8,854,998 B2 | 10/2014 | Johansson et al. |
| 8,917,649 B2 * | 12/2014 | Sfar .................. H04B 7/15592 370/315 |
| 9,160,426 B2 | 10/2015 | Ko et al. |
| 9,445,284 B2 * | 9/2016 | Bontu .................. H04L 1/0015 |
| 2007/0086512 A1 | 4/2007 | Can et al. |
| 2007/0149129 A1 | 6/2007 | Das et al. |
| 2007/0217432 A1 | 9/2007 | Molisch et al. |
| 2008/0144552 A1 | 6/2008 | Johansson et al. |
| 2008/0165721 A1 | 7/2008 | Fujii et al. |
| 2008/0185721 A1 | 8/2008 | Oomori et al. |
| 2008/0282133 A1 | 11/2008 | Lo et al. |
| 2009/0175214 A1 | 7/2009 | Sfar et al. |
| 2009/0227201 A1 | 9/2009 | Imai et al. |
| 2010/0008284 A1 | 1/2010 | Chae et al. |
| 2010/0232345 A1 | 9/2010 | Tsai et al. |
| 2010/0323720 A1 * | 12/2010 | Jen ....................... H04B 7/2606 455/456.1 |
| 2010/0330902 A1 | 12/2010 | Fujita |

FOREIGN PATENT DOCUMENTS

| | | |
|---|---|---|
| CN | 101965741 A | 2/2011 |
| EP | 1843488 A1 | 10/2007 |
| EP | 1885076 A1 | 2/2008 |
| WO | 2006118125 A1 | 11/2006 |
| WO | 2009118780 A1 | 10/2009 |
| WO | 2010034339 A1 | 4/2010 |
| WO | 2010041295 A1 | 4/2010 |

OTHER PUBLICATIONS

3GPP TS 36.213 V9.3.0; 3rd Generation Partnership Project; Technical Specification Group Radio Access Network; Evolved Universal Terrestrial Radio Access (E-UTRA); Physical Layer Procedures; Release 9; Sep. 2010; 80 pages.
3GPP TS 36.213 V10.0.1; 3rd Generation Partnership Project; Technical Specification Group Radio Access Network; Evolved Universal Terrestrial Radio Access (E-UTRA); Physical Layer Procedures; Release 10; Dec. 2010; 98 pages.
3GPP TS 36.211 V9.1.0; 3rd Generation Partnership Project; Technical Specification Group Radio Access Network; Evolved Universal Terrestrial Radio Access (E-UTRA); Physical Channels and Modulation; Release 9; Mar. 2010; 85 pages.
3GPP TS 36.211 V10.0.0; 3rd Generation Partnership Project; Technical Specification Group Radio Access Network; Evolved Universal Terrestrial Radio Access (E-UTRA); Physical Channels and Modulation; Release 10; Dec. 2010; 103 pages.
Hoshyar, Reza, et al.; "Performance Evaluation of HARQ Schemes for Cooperative Regenerative Relaying;" IEEE; 2009; 6 pages.
Ni, Wei, et al.; "HARQ Mechanisms in Multi-hop Relay"; IEEE S802.16j-07/163rl; Jan. 15, 2007; 8 pages.
Can, Basak, et al.; "Link Adaptation and Selection Method for OFDM Based Wireless Relay Networks"; Journal of Communication and Networks; vol. 9, No. 2; Jun. 2007; 10 pages.
Can, Basak, et al.; "Hardware Aspects of Fixed Relay Station Design for OFDM(A) Based Wireless Relay Networks"; IEEE; 2008; 6 pages.
Can, Basak, et al.; "Hybrid Forwarding Scheme for Cooperative Relaying in OFDM Based Networks"; IEEE; 2006; 6 pages.
Beres, Elzbieta; "Node Selection in Cooperative Wireless Networks"; 2009; 169 pages.
3GPP TSG-RAN WG1 #56bis; "Further Consideration on L2 Transparent Relay"; R1-091403; Seoul, Korea; Mar. 23-27, 2009; 7 pages.
C++ Forum; "Find a Largest Number"; http://www.cplusplus.com/forum/beginner/14929/; Oct. 1-2, 2009; 2 pages.
Spyropoulos, Thrasyvoulos, et al.; Spray and Focus: Efficient Mobility-Assisted Routing for Heterogeneous and Correlated Mobility; IEEE International Conference on Pervasive Computing and Communications Workshops; Apr. 2007; 7 pages.
Office Action dated Feb. 13, 2012; U.S. Appl. No. 12/768,016, filed Apr. 27, 2010; 40 pages.
Final Office Action dated Aug. 17, 2012; U.S. Appl. No. 12/768,016, filed Apr. 27, 2010; 31 pages.
Notice of Allowance dated Dec. 28, 2012; U.S. Appl. No. 12/768,016, filed Apr. 27, 2010; 9 pages.
Office Action dated Aug. 2, 2013; U.S. Appl. No. 13/788,978, filed Mar. 7, 2013; 40 pages.
Final Office Action dated Feb. 20, 2014; U.S. Appl. No. 13/788,978, filed Mar. 7, 2013; 40 pages.
Notice of Allowance dated May 12, 2014; U.S. Appl. No. 13/788,978, filed Mar. 7, 2013; 8 pages.
Office Action dated Apr. 13, 2015; U.S. Appl. No. 13/985,516, filed Aug. 14, 2013; 24 pages.
Office Action dated Oct. 23, 2015; U.S. Appl. No. 13/985,516, filed Aug. 14, 2013; 16 pages.
Notice of Allowance dated May 5, 2016; U.S. Appl. No. 13/985,516, filed Aug. 14, 2013; 18 pages.
PCT International Search Report; Application No. PCT/CA2011/050099; Nov. 17, 2011; 4 pages.
PCT Written Opinion of the International Searching Authority; Application No. PCT/CA2011/050099; Nov. 17, 2011; 5 pages.
Chinese Office Action; Application No. 2011800701792; Mar. 9, 2016; 13 pages.
European Extended Search Report; Application No. 11157962.9; Sep. 15, 2011; 6 pages.
European Examination Report; Application No. 11157962.9; Jun. 18, 2015; 3 pages.
Canadian Office Action; Application No. 2,738,190; May 21, 2013; 3 pages.
Chinese Office Action; Application No. 201110115241.7; Sep. 22, 2013; 9 pages.
Japanese Office Action; Application No. 2011-099460; Sep. 4, 2012; 7 pages.
Korean Office Action; Application No. 10-2011-0039604; Aug. 20, 2012; 8 pages.
Chinese Office Action; Application No. 2011800701792; Nov. 11, 2016; 7 pages.

* cited by examiner

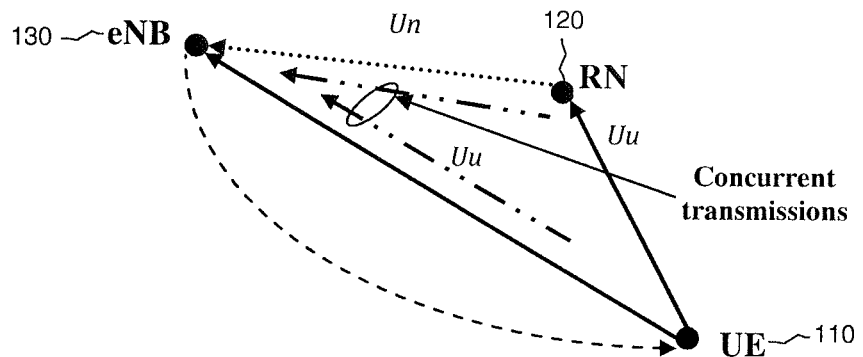

- → Transmission at time $t_1$
- ⋯▸ Transmission at time $t_2$ ($t_2 > t_1$) (Packet or NACK)
- −−−▸ ACK/NACK at time $t_3$ ($t_3 > t_2$) − this message may be relayed by the RN to the UE
- —··▸ Cooperative Transmission from UE and RN at time $t_4$ ($t_4 > t_3$)

Figure 2

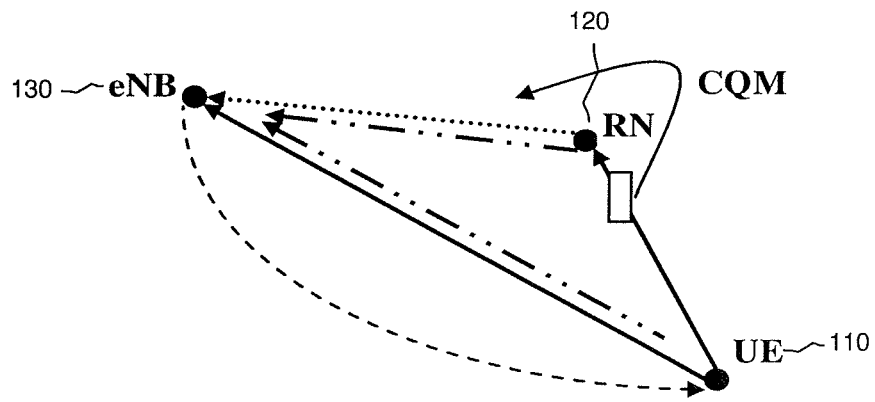

- → Transmission at time $t_1$
- ⋯▸ Transmission at time $t_2$ ($t_2 > t_1$)
- −−−▸ ACK/NACK at time $t_3$ ($t_3 > t_2$) − this message may be routed through RNs for combining at the UE
- —··▸ Concurrent Transmission at time $t_4$ ($t_4 > t_3$)

Figure 3

→ Transmission at time $t_1$

— ·· → Transmission at time $t_2$ ($t_2 > t_1$)

— — — ► ACK/NACK at time $t_3$ ($t_3 > t_2$) – this message may be routed through RNs for combining at UE

PACKET DELAY OPTIMIZATION IN THE UPLINK OF A MULTI-HOP COOPERATIVE RELAY-ENABLED WIRELESS NETWORK

CROSS REFERENCE

This application is a continuation of U.S. patent application Ser. No. 13/985,516 filed Aug. 14, 2013 by Chandra Sekhar Bontu, et al. entitled, "Packet Delay Optimization in the Uplink of a Multi-Hop Cooperative Relay-Enabled Wireless Network", which is a filing under 35 U.S.C. 371 of International Application No. PCT/CA2011/050099 filed Feb. 17, 2011, entitled "Packet Delay Optimization in the Uplink of a Multi-Hop Cooperative Relay-Enabled Wireless Network" both of which are incorporated by reference herein as if reproduced in their entirety.

BACKGROUND

As used herein, the terms "device," "user equipment," and "UE" might in some cases refer to mobile devices such as mobile telephones, personal digital assistants, handheld or laptop computers, Blackberry® devices, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and might include an E-UTRAN node B (or eNB), a wireless access point, or a similar component rather than a traditional base station. As used herein, the terms "eNB" or "access node" refer to any component of the wireless network, such as a traditional base station, a wireless access point, or an LTE or LTE-A node B or eNB, that creates a geographical area of reception and transmission coverage allowing a UE or a relay node to access other components in a telecommunications system. An eNB may comprise a plurality of hardware and software.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a diagram of communication links in a portion of a cellular network, according to an embodiment of the disclosure.

FIG. 3 is a diagram of an ACK/NACK between an eNB and a UE with CQM mapped, according to an embodiment of the disclosure.

DETAILED DESCRIPTION

Figure 1:
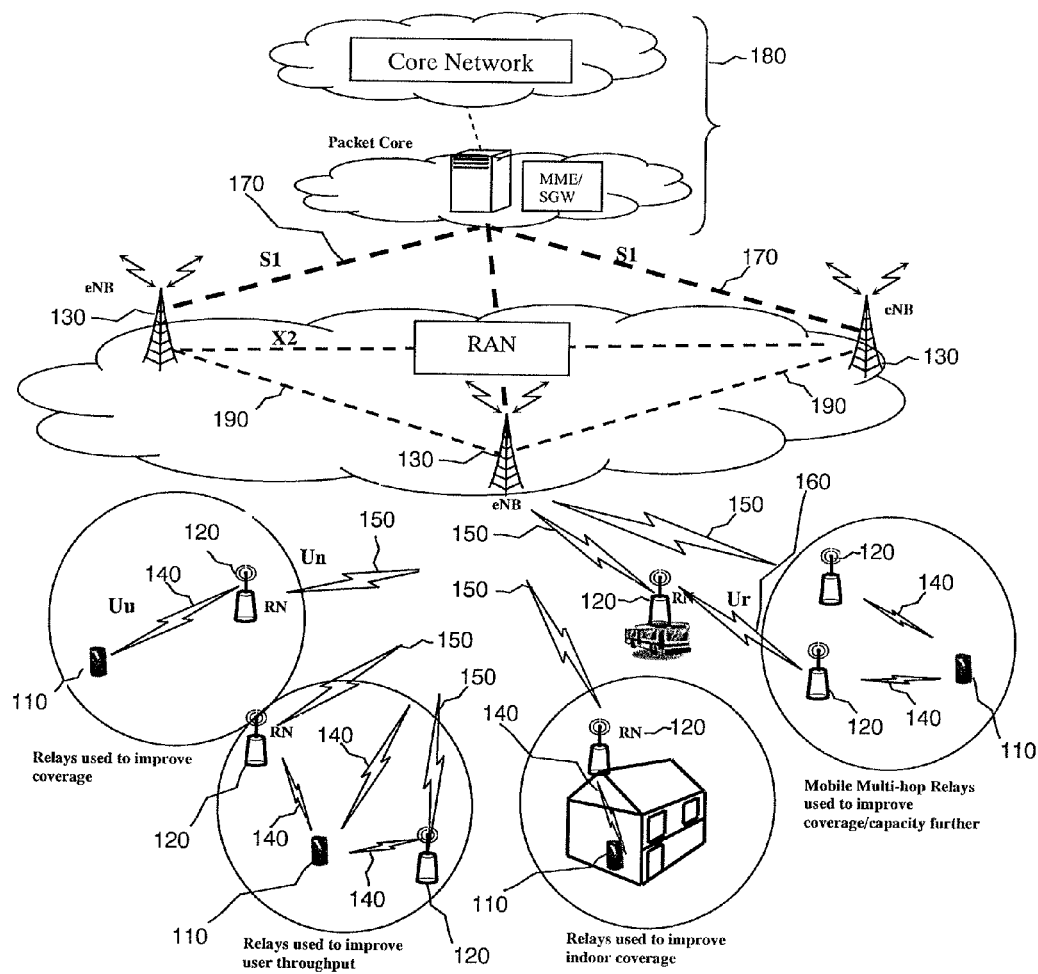
FIG. 1 is a diagram of an architecture of a cellular network incorporating wireless relay nodes.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Although the present system may be described in the context of a cellular network, one or more aspects of the present disclosure may be employed in other types of networks as well. The embodiments described herein relate to the reduction of packet delay in an uplink transmission of a relay-enabled cellular network. However, these techniques are equally applicable to downlink transmissions. More specifically, in an embodiment, a relay node might transmit a packet received from a UE to an eNB even when an error checking procedure indicates that there might be errors in the packet. The relay node also measures the quality of the packet received from the UE, and the quality of the packet represents the quality of the communication link between the relay node and the UE. In one embodiment, the relay node transmits a channel quality measurement to the eNB, and the eNB uses the channel quality measurement in combining packets received from the relay and from the UE. In another embodiment, the relay node uses the channel quality measurement to adjust the power at which the relay node transmits the packet to the eNB, and packets transmitted from the relay and from the UE are then combined at the eNB or the packets transmitted from the relay and the UE are naturally combined over the air and received by the eNB.

Relay nodes (RNs) might be introduced into a cellular network to extend signal coverage and/or improve overall system capacity. When an RN is placed in or near a cell edge, a UE at the cell edge can communicate with the RN rather than communicating directly with the eNB for that cell. The RN can amplify or repeat a signal received from the UE and send the modified signal to the eNB and can also receive data from the eNB and deliver the data to the UE.

Within the Third Generation Partnership Project (3GPP) technical specifications, RNs have been categorized into two basic types, Type 1 and Type 2. A Type 1 or "non-transparent" RN is one that has its own physical cell ID and which therefore appears to a UE just like any other distinct cell transmitted by an eNB. The UE "camps on" the cell transmitted by the RN. In addition to its own physical cell ID, this type of RN typically has its own control signaling enabling it to manage/schedule resources in its own cell. A Type 2 or "transparent" RN is one that shares its physical cell ID with that of its donor eNB. The UE is therefore unaware that its communications are passing through the RN. This type of RN typically does not have its own control signaling; transmission resources are instead coordinated by the donor eNB using its own control signaling.

RNs may also be categorized according to the protocol layer at which the relaying takes place. Layer 0 (L0) RNs are those that merely receive the radio frequency (RF) signal and amplify it prior to onward transmission. Layer 1 (L1) RNs are those that perform some form of demodulation and/or forward error correction decoding prior to possible re-encoding and re-modulation and subsequent onward transmission. Layer 2 (L2) RNs are typically those that perform the necessary L1 processing to decode the L2 data, and which may also operate or participate in Hybrid Automatic Repeat Request (HARQ) schemes for retransmission of erroneous data prior to onward transmission of the data. The radio resources are coordinated between the eNB and the RNs. The resource scheduling is performed independently by each node with limited coordination from the other nodes. An L2 relay performs MAC functionality partially or fully independently from the eNB. Layer 3 (L3) RNs may be conceptualized as being similar to a "normal" base station or eNB, operating a full suite of L1, L2, and L3 protocols but with a wireless backhaul for conveyance of the data towards the network. A "Layer x" RN is distinguished from a "Type x" RN. For example, a layer 1 RN is not a Type 1 RN; in fact, a Type 1 RN is functionally similar to a Layer 3 RN.

For the purposes of this disclosure, an RN is distinguished from an eNB or other access node by the fact that an RN requires the presence of at least one eNB or other access node (and the cell associated with that access node) and possibly other RNs to access other components in a telecommunications system, such as a Mobility Management Entity/Serving Gateway (MME/SGW). Additionally, for the purposes of this disclosure, the term "eNB" is not limited to only an "evolved node-B," but also may refer to any type of access node suitable for communicating with an MME/SGW or another component of an enhanced packet core. Also, when the term "node" is used without a modifier, the node might be either an RN or a UE.

Most commonly, a wireless backhaul link is assumed between an RN and its donor eNB. When the backhaul link between an RN and a donor eNB exists within the same portion of the radio frequency spectrum as the RN-to-UE link and the eNB-to-UE link, such a link is referred to as an "in-band" backhaul. When the backhaul link between an RN and a donor eNB exists within a different portion of the radio frequency spectrum from the RN-to-UE link and the eNB-to-UE link, the link is referred to as an "out-of-band" backhaul.

The communication link between an eNB and an RN can be referred to as the Un interface. The communication link between an eNB/RN and a UE can be referred to as the Uu interface. In a multi-hop scenario, where a signal passes through multiple RNs before reaching the UE, the communication link between two RNs can be referred to as the Ur interface. Transmission methods are initially described herein for single-hop communication and are later extended to a multi-hop scenario.

FIG. 1 depicts a possible LTE network architecture in which a plurality of UEs 110, RNs 120, and eNBs 130 are employed and in which the aforementioned Uu interfaces 140, Un interfaces 150, and Ur interfaces 160 are shown. Also shown are the S1 control/user plane interfaces 170 between the eNBs 120 and a core network 180 and the X2 control plane (signaling) interfaces 190 between the eNBs 130. As illustrated, the RNs 120 can be used for improving the coverage and/or capacity of a cellular network.

When multiple network nodes, such as eNBs 130 or RNs 120, cooperate, the performance can be improved further. RNs 120 placed on top of moving vehicles can be opportunistically used for further improving coverage and capacity of the network by helping the UEs within the moving vehicle and/or the outdoor UEs in the vicinity of the moving vehicle.

On the uplink (UL) of a typical relay deployment, the signal transmitted by a UE might go through multiple relay nodes before reaching an eNB. Therefore, even though coverage and capacity are improved, packet delay may be affected adversely. For real time applications such as voice calls and video streaming, increased packet delay can lead to quality degradation and loss in frame synchronization. For non-real-time services such as web browsing, an increase in latency can degrade the user's perception of the speed of access.

In the existing LTE standards, cooperative communication procedures in multi-hop relaying do not exist. In a typical non-cooperative transmission, only one component, either an eNB or an RN, communicates with the UE at any given time. Based on the coverage, the RN, the eNB, or both may listen to the UE transmission. If the RN is communicating with the UE and if the RN is not visible to the UE, the UL control signaling such as an acknowledgement/negative acknowledgement (ACK/NACK) might be routed through the eNB. This could introduce packet delay.

In this disclosure, novel UL HARQ schemes for single-hop/multi-hop cooperative communication links are provided to reduce end-to-end packet delay in relay-enabled cellular networks. The HARQ schemes are suitable when the existence of an RN is transparent to a UE. Even though the methods are described for a case where a UE is not aware of the presence of an RN, the same techniques can also be applied to a case where an RN is visible to a UE. More specifically, cooperative HARQ transmissions to optimize packet delay over the air are provided, different techniques are provided for cooperative transmission and reception from different network nodes to improve system capacity, and link optimization and signaling are provided for the cooperative transmission schemes. The embodiments are described for L2/Type 2 relays, but the embodiments may also be applicable to L0, L1, or L3 Type 1 relays or in general to any multi-hop wireless relay deployment. Also, the discussion herein assumes a 3GPP LTE UL, but the techniques presented herein are equally applicable to any other transmission formats of 3GPP or non-3GPP standards.

At least three issues related to current relay-based communications are addressed by the embodiments described herein. First, currently there may be some packet delay while an RN performs error checking on a packet. An RN typically ensures that the received packet is error free before relaying the packet to an eNB. Second, cooperative communication among a group of RNs might not be possible currently because of different HARQ requirements at each of the RNs. Third, an RN cannot currently send HARQ-related messages to a UE if the UE is not aware of the presence of the RN.

The present embodiments address the first issue by providing a procedure whereby an RN sends packets to an eNB even when errors exist in the packets received from a UE. The present embodiments address the second issue by providing a procedure whereby a UE and one or more RNs can send packets to an eNB at the same time. The present embodiments address the third issue by providing a procedure which enables an end-to-end HARQ mechanism between a UE and an eNB. While the description herein focuses on an RN receiving a packet from a UE and measuring the channel quality based on the packet received from the UE, similar considerations could apply to a situation where an RN receives a packet from another RN or multiple RNs or multiple RNs and the UE and measures the channel quality based on the packet received from the other RN or multiple RNs or multiple RNs and the UE.

FIG. 2 depicts a single-hop scenario, where an independent HARQ mechanism is allowed over Un and Uu. As depicted in FIG. 2, the UE 110 transmits information to the eNB 130 at time $t_1$ over the communication link Uu using the resources granted by the eNB 130. Since the eNB's resource grant to the UE 110 may be received by the RN 120, the RN 120 may be able to listen to the UE's transmission. The RN 120 may relay the received information to the eNB 130 at time $t_2$ if the packet is successfully decoded. If the received packet is not successfully received, the RN 120 may request retransmission from the UE 110. Since it is assumed here that the RN 120 is not visible to the UE 110, the retransmission request may be sent through the eNB 130. If the eNB 130 receives the retransmission request or a NACK from the RN 120, and further, if the eNB 130 does not successfully decode the packet received from the UE 110, then the eNB 130 may request a retransmission from the UE 110 at time $t_3$. On the other hand, if the eNB 130 receives a relayed packet from the RN 120 successfully, the eNB 130 may attempt to decode the packet again by combining the information received from the RN 120 with the earlier transmission received from the UE 110 at time $t_1$. The UE 110 keeps transmitting to the RN 120 and the eNB 130 until the transmission is acknowledged (ACKed) by the eNB 130. To improve the reception quality of the ACK/NACK feedback signaling, the RN 120 may cooperatively transmit the ACK/NACK to the UE 110. If the RN 120 successfully decodes the packet, but the eNB 130 does not receive the packet successfully, the RN 120 may cooperate with a subsequent retransmission from the UE 110 at time $t_4$, as depicted in FIG. 2.

In the cooperative HARQ described above, packet delay may increase when the channel conditions over the communication links Uu and/or Un are not good. One possible solution for reducing this packet delay is to have the RN relay packets to the eNB even when errors may exist in the packets. That is, the packets could be transmitted even when the cyclic redundancy check (CRC) fails. This will reduce packet delay, but the cooperative decoding gain at the eNB may be affected, since an invalid packet relayed by the RN may corrupt the combined packet decoding at the eNB. This is more probable in the case of adverse channel conditions over the communication link Uu. It would be advantageous if the cooperative transmissions from the RN(s) and/or the UE could be combined at the eNB in a manner that is proportional to the quality of reception at one or more of the RNs.

In an embodiment, an eNB is made aware of a relayed packet's previous reception quality over the Uu at the RN. This channel quality measure can be used to adjust the relative emphasis (or "weight") given to the direct UE-to-eNB signals and to the signals forwarded by the RN when the signals are combined at the eNB. For example, if the reception quality of the signal from the RN is known to be poor, it may be preferable for the signal from the RN to have less influence during the overall packet decoding.

In an embodiment, an RN calculates a channel quality measurement (CQM) measured during its packet decoding/demodulation. In order to appropriately effect the combining at the eNB of the signals transmitted from UE and from the RN, the CQM may be used in two different ways. In a first CQM scheme, the RN measures a CQM over the link Uu and appends the CQM to the packet transmission forwarded to the eNB. Based on this CQM, the eNB can appropriately scale the received information from the UE and from the RN and may subsequently combine them. In a second CQM scheme, a transmission from an RN can be properly power controlled according to the CQM observed over Uu. Both of these schemes may be represented as shown in FIG. 3. The difference concerns the stage at which the CQM is applied. It is assumed here that the RN can transmit the received information from the UE to the eNB for the first time before the eNB sends an ACK/NACK to the UE.

The first CQM scheme is more suited to a scenario in which the Un transmissions are made on different time and/or frequency resources than the direct UE-to-eNB Uu transmissions. In this case, the Un transmissions and the Uu transmissions may be received independently at the eNB and may then be weighted and explicitly combined by the eNB according to (at least in part) the signaled CQM report received from the RN.

Conversely, the second CQM scheme is more suited to a scenario in which the Un transmissions are made on the same time and frequency resources as the Uu transmissions. In this case, the signals are combined naturally "over-the-air", or as part of the eNB's normal reception/equalization process. Any relative scaling of the Un and Uu signals occurs prior to the signals being sent to the eNB. For example, the scaling might be performed at the RN transmitter.

The second CQM scheme is also possible in a scenario where the Un transmissions are made on different time and/or frequency resources. In this case, the independent transmissions from the RN and the UE are weighted according to the CQM at the transmit side and are combined at the receiver without scaling.

As an example, an RN that receives a packet consisting of 100 bits of data may receive 90 of the bits correctly and may fail to correctly receive 10 of the bits. Currently, the RN may not send such a packet to the eNB. Instead, the RN may wait for a retransmission of the packet, combine the retransmission with the original transmission, and send the combined transmissions to the eNB if the error bits are successfully corrected by the retransmission. If the error bits are not successfully corrected by the retransmission, the RN may wait for another retransmission and try again to correct the error bits. This procedure may continue until the error bits have been corrected, and the RN might then send the packet to the eNB.

Under the present embodiments, the RN would send the packet with only 90 out of 100 correct bits to the eNB. The RN would also measure the CQM and modify a transmission to the eNB based on the CQM, either by appending the CQM to the transmission or by controlling the power of the transmission based on the CQM. The eNB may then be able to use the packet received directly from the UE to correct the 10 error bits in the packet received from the RN.

Figure 4:
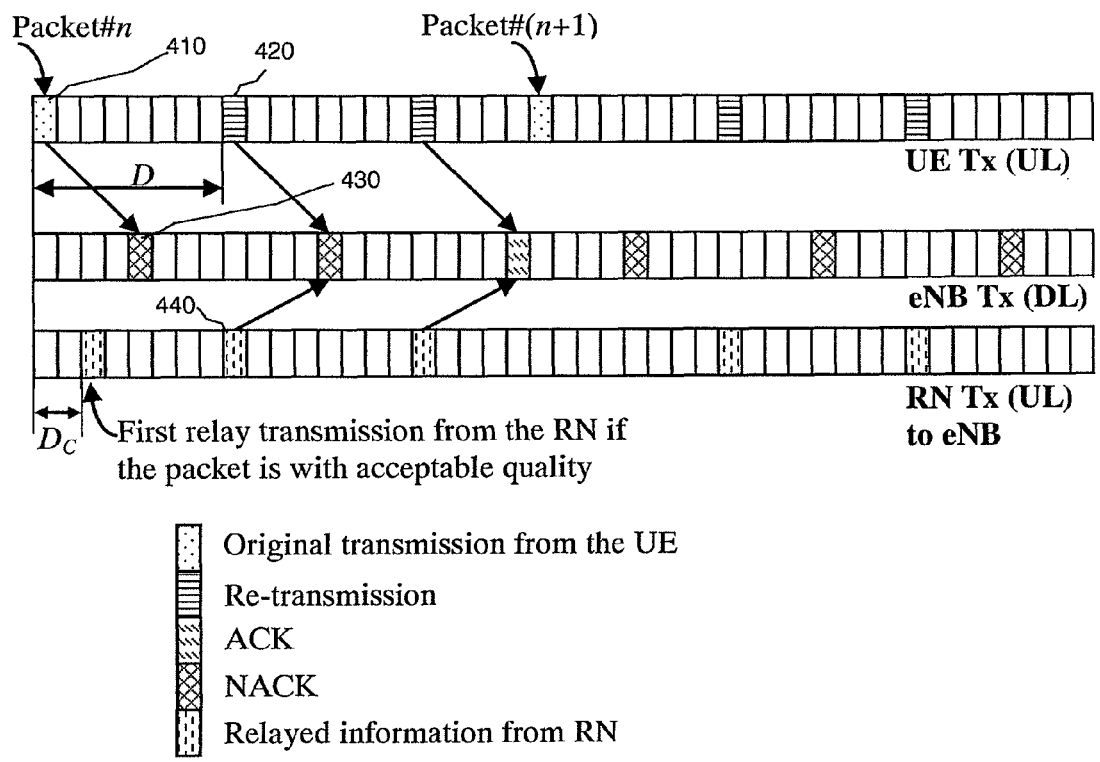
FIG. 4 is a timing diagram for a CQM scheme, according to an embodiment of the disclosure.

A more detailed description of the smart relaying function with the above mentioned cooperative HARQ is now provided. FIG. 4 shows the packet transmission and ACK/NACK signaling timing from each node. The case depicted corresponds to a synchronized HARQ transmission from the UE. "D" represents the retransmission time. "$D_c$" represents the time taken by the RN to demodulate/decode the original transmission received the UE, re-encode/re-modulate, and become ready to transmit to the eNB (if the CQM is acceptable).

The RN listens to the UE's transmission at subframe 410 and measures a CQM while detecting a packet. When the measured CQM is found to be unacceptable, the RN may listen to the retransmission at subframe 420 from the UE or other cooperating nodes (in the case of a NACK at subframe 430 from the eNB on the previous transmission). The packet received by the RN in the retransmission is combined with the previous transmissions and the CQM is calculated again. If the CQM is acceptable, then the packet is transmitted/relayed to the eNB. It is assumed that the eNB grants appropriate resources for the RN's first relay transmission. The resource grant for the RN's first relay transmission can be an accumulated grant for the purpose of transmitting the packet from multiple UEs. The packet relaying from different UEs can be scheduled by the RN and/or the eNB based on the packet deadlines. (When radio resources are scheduled or granted for a UE, normally the quality of service (QoS), such as packet delay or packet error, is taken into account. Each incoming packet is assigned a delay deadline by the scheduler. The "packet deadline" is the time before which the packet has to be transmitted to meet the QoS requirements.)

The transmission from the RN to the eNB might be appended with the observed CQM. Alternatively, the power of the transmission from the RN to the eNB might be controlled according to the CQM. Assuming a Type 2 relay, the modulation and coding scheme for the UE's first transmission is decided based on the link quality between the UE and the eNB. The modulation and coding scheme for transmission from the RN to the eNB for the first relaying on Un is decided by the quality feedback communicated to the RN by the eNB. If the CQM at the RN is of acceptable quality, the next retransmission will be from both the RN and the UE concurrently in the same subframe, as shown at subframes 420 and 440. A half duplex RN may not listen to the UE for retransmissions while relaying the previously received packet (with acceptable CQM) to the eNB. A full duplex RN may listen to all the retransmissions from the UE and keep decoding the packet based on the previous transmission and the current transmission.

Figure 5:
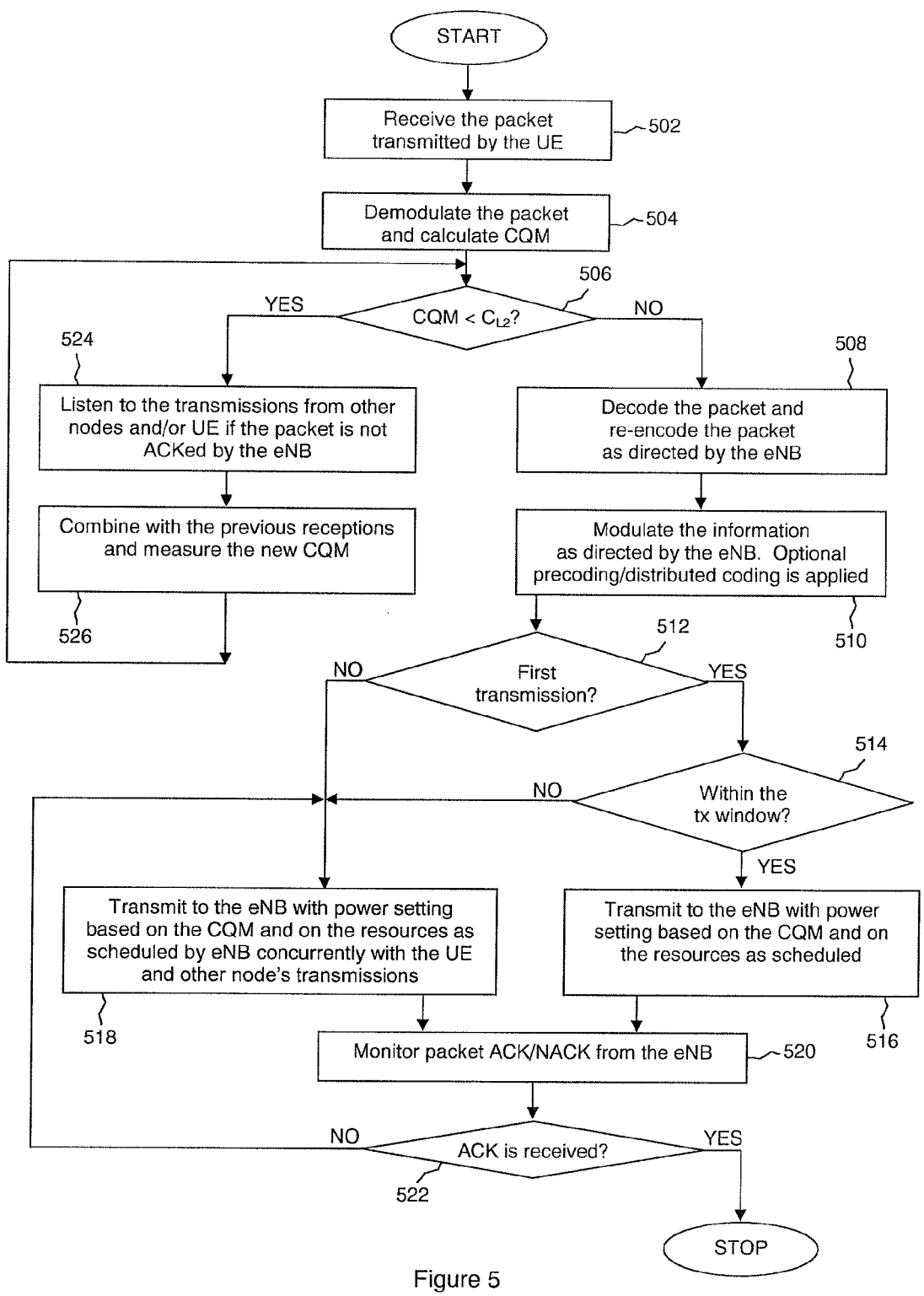
FIG. 5 is a flowchart of a relay node's state machine for smart relaying, according to an embodiment of the disclosure.

FIG. 5 shows the state diagram of a half duplex RN for UL transmission. At block 502, an RN receives a packet transmitted by a UE. At block 504, the RN demodulates the packet received from the UE and calculates a CQM over the packet during the demodulation process. At block 506, the RN compares the measured CQM to a predefined threshold, $C_{L2}$. If the CQM is not acceptable, that is, if the CQM is less than $C_{L2}$, the RN proceeds to block 524. If the CQM is acceptable, that is, if the CQM is not less than $C_{L2}$, the RN may proceed with packet decoding at block 508. At block 508, the signal is decoded and re-encoded as directed by the eNB in the resource grant. The packet encoding may be different from the encoding applied by the UE in its original transmission.

At block 510, the RN re-modulates the signal with the modulation scheme suggested in the resource grant received from the eNB and transmits the packet over the granted physical resources. The resource grant is set in the physical downlink control channel, which might be either the relay physical downlink control channel (R-PDCCH) or the PDCCH based on whether relay transmissions concurrent with UE transmissions use independent concurrent transmission or cooperative concurrent transmission. The R-PDCCH is relevant when the first relay transmission or any subsequent relay transmission is sent using different resources compared to the UE's retransmission (i.e., concurrent transmission using different resources). The PDCCH is relevant for all subsequent transmissions after the first relay transmission when the same resources are used as the UE's retransmission (i.e., concurrent transmission using the same resources) The RN may optionally apply spatial encoding across its transmit antennas.

At block 512, if this is the first relay transmission, the RN checks its packet scheduling queue and proceeds to block 514. At block 514, the RN checks whether the packet transmission can be performed before a scheduled deadline. This ensures that the eNB can send packet ACK/NACK back to the UE within the HARQ retransmission window (this condition is only valid for synchronous HARQ). Further details on this portion of the procedure are provided below. If the RN can respect the packet deadline constraints, the packet, at block 516, may be relayed to the eNB with the power settings depending on the derived CQM. Alternatively, the CQM can be appended to the MAC payload.

Returning to block 512, if the packet relay transmission is not the first one, then the RN may proceed to block 518 and transmit the packet concurrently along with the UE's retransmission. The transmission is either power controlled according to the CQM or appended with the CQM. Various modes of concurrent transmissions are possible as described below. Also, if it is determined at block 514 that the transmission is not within the transmission window, the flow proceeds to block 518. As illustrated, at block 518, the packet is retransmitted to the eNB concurrently with the UE transmission (i.e., the RN holds this retransmission until the next opportunity for UE retransmission. At that time, the RN relays the packets on the physical resources as indicated by the R-PDCCH or PDCCH). At block 520, after relaying the packet, the RN may monitor the packet ACK/NACK from the eNB. At block 522, if the eNB sends an ACK, the packet is believed to be successfully delivered and the procedure ends. Otherwise, the RN readies for a retransmission and returns to block 518.

Returning to block 506, if the packet reception quality from the UE is below the predefined threshold, $C_{L2}$, then the RN may decide not to relay the packet to the eNB. Instead, the RN may proceed to block 524, where it listens to the subsequent retransmissions from the other cooperating nodes. If the eNB ACKs the packet, then the RN exits this state. At block 526, when packet retransmissions from other nodes are received, the RN may try to decode the packet by combining the current transmission with the previously received transmissions of the same packet. During the signal demodulation process, the RN may re-compute the CQM and return to block 506.

The packet delay can be further optimized when the RN selectively performs demodulation and decoding based on the CQM scheme. When the first CQM scheme is used, the RN merely demodulates and forwards. That is, the RN demodulates the received information, takes the hard decision of the coded bits, and then re-modulates and relays the received information. When the second CQM scheme is used, the RN demodulates, decodes, and forwards. That is, the RN demodulates and decodes the received information, takes the hard decision of the information bits, and then re-encodes, re-modulates, and relays the received information.

Figure 6:
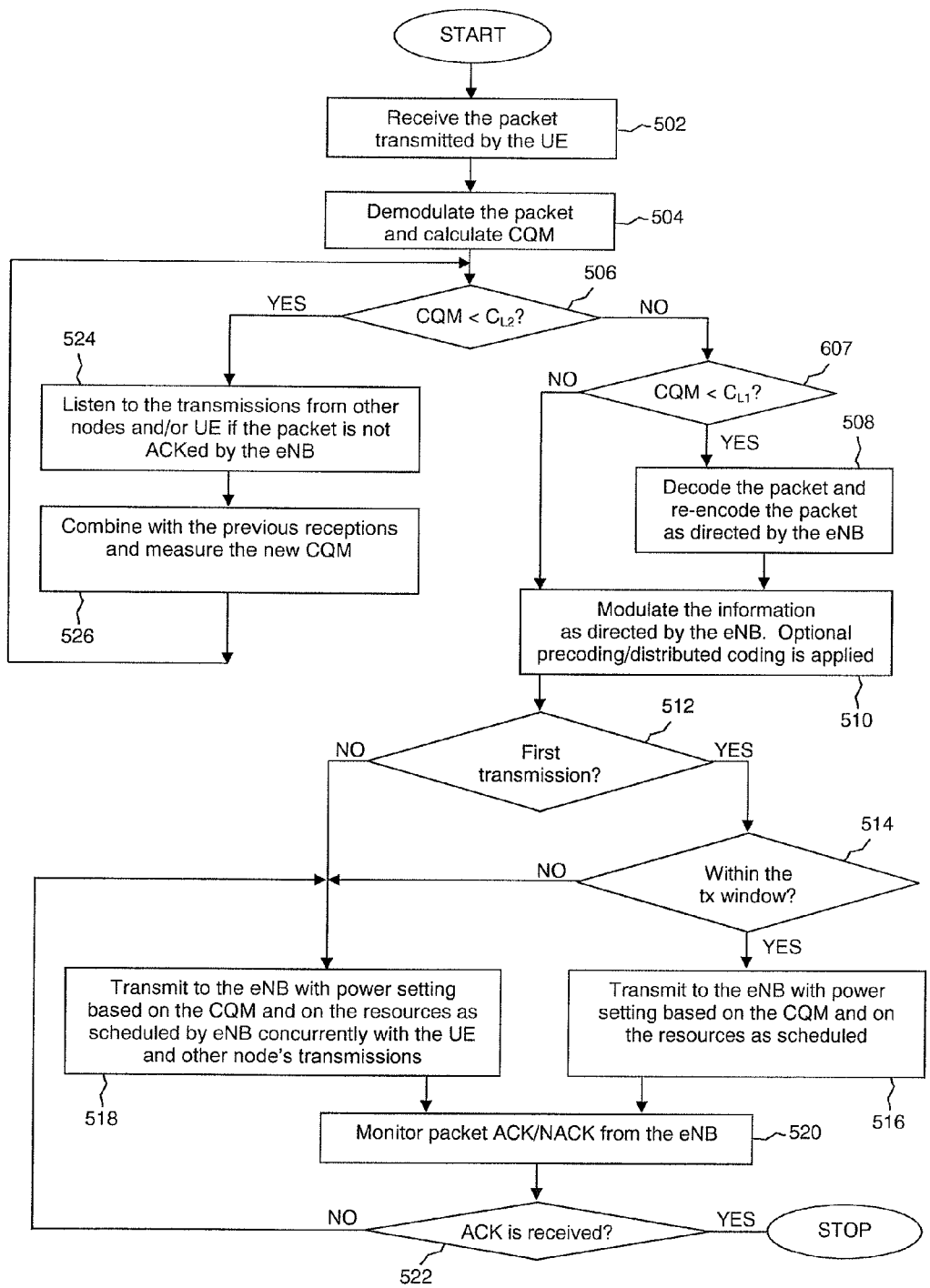
FIG. 6 is a flowchart of a relay node's state machine for smart relaying, according to an alternative embodiment of the disclosure.

This selective relaying scheme is depicted in FIG. 6. This scheme is similar to that of FIG. 5, except for the inclusion of an additional step. At block 607, the RN further compares the CQM measured over the received packet with yet another threshold $C_{L1}$, where $C_{L1} > C_{L2}$. If the CQM is not less than $C_{L1}$, that is, if the channel quality is high, the RN does not decode the packet. Instead, the RN proceeds to block 510, where it re-modulates the information and forwards the information to the eNB after setting the transmission power of the packet according to the CQM (or the CQM is appended to the packet). If, at block 607, the CQM is less than $C_{L1}$, that is, if the channel quality is between the two thresholds, the RN decodes the packet at block 508. The RN then proceeds to block 510. As shown in FIG. 6, the additional step at block 607 further decreases the packet delay and the RN power consumption by not performing decoding when the channel quality is high.

Figure 7:
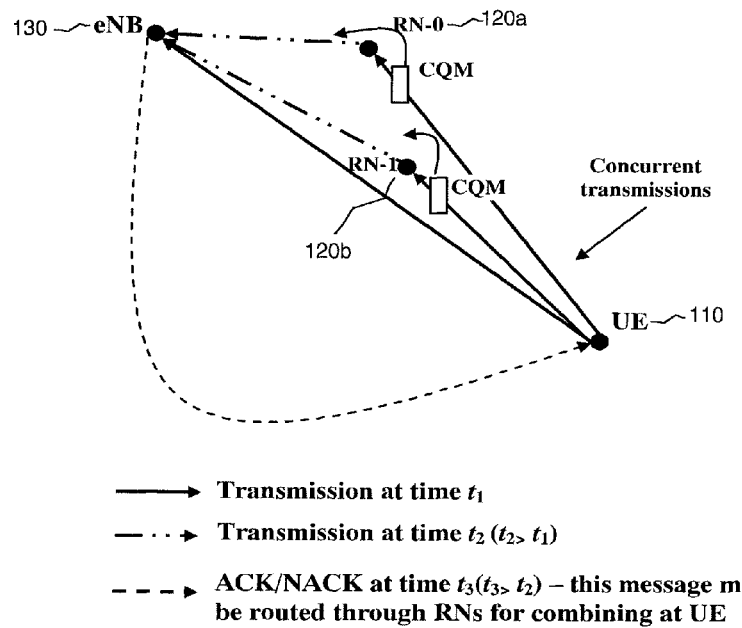
FIG. 7 is a diagram of a generalized relaying procedure for a multi-hop network, according to an embodiment of the disclosure.

The above described smart relaying can be easily extended to multi-hop communication links. A two-hop relaying scenario with coordination among the nodes is shown in FIG. 7. The UE's transmission on the granted resources is received by the RNs 120 and the eNB 130. Subsequently, RN-0 120a and RN-1 120b send information to the eNB 130 concurrently either using the same resources or different resources. The eNB 130 can combine the original information transmission from the UE 110 and the relayed information from the RNs 120. There is one ACK/NACK signal based on the combined signal reception quality from the eNB 130 to the UE 110. The ACK/NACK signaling can also be sent by the RNs 120 in synchronization with the eNB's downlink transmission to improve the ACK/NACK reception quality at the UE 110.

Figure 8:
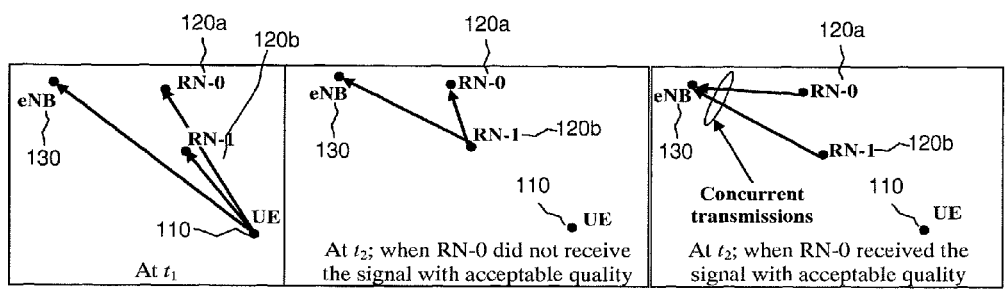
FIG. 8 is a diagram of relay node states based on the CQM, according to an embodiment of the disclosure.

If the CQM observed by RN-0 120a is not good, RN-0 120a may decide not to transmit the information, and instead may choose to listen to RN-1's transmission to the eNB 130. In the subsequent retransmission, RN-0 120a will transmit to the eNB 130 along with RN-1 120b and the UE. The information transmitted by RN-0 120a is based on the decoded information from the present and the previous reception of the same information from different nodes. This is shown in FIG. 8.

Figure 9:
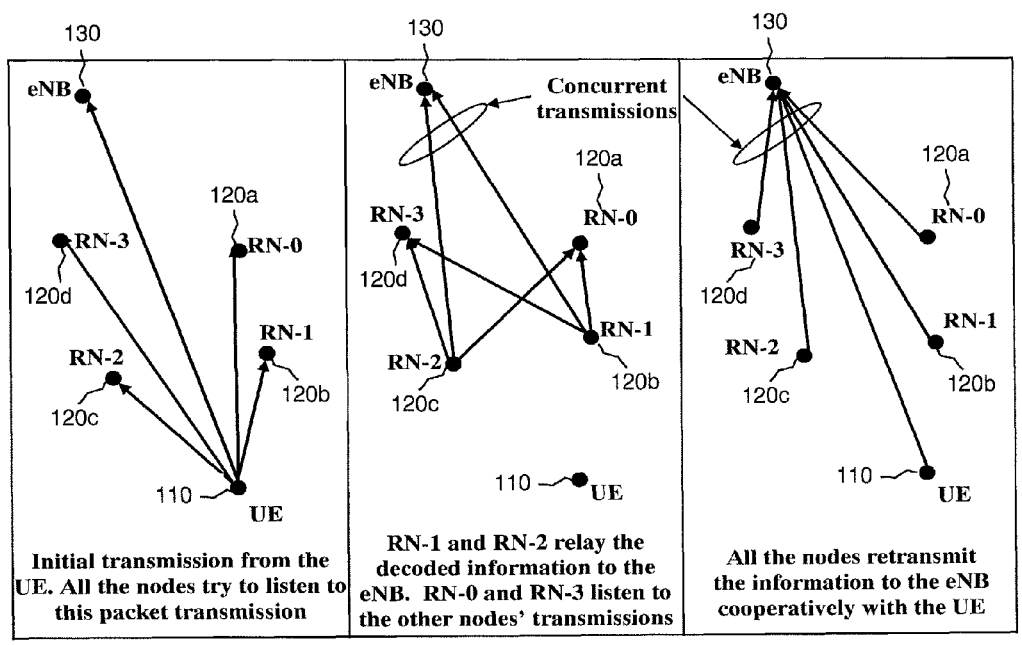
FIG. 9 is a diagram of another example of multi-hop cooperative transmission on the uplink, according to an embodiment of the disclosure.

Another example of a multi-hop relay scenario is depicted in FIG. 9. In this scenario, there are four relays 120 involved in UL transmissions to the eNB 130. RN-1 120b and RN-2 120c are close to the UE 110 and may receive the signal from the UE 110 with acceptable CQM during the UE's initial transmission. During the scheduled transmission to the eNB 130, only RN-1 120b and RN-2 120c may cooperatively transmit the information to the eNB 130. However, RN-0 120a and RN-3 120d, with unacceptable CQM during the UE's initial transmission, may listen to the transmissions from the other nodes. These received signals are combined with the initial signal reception to improve the overall CQM. For the next transmission (i.e., the first retransmission from the UE 110) all four RNs 120 can transmit the information concurrently with the UE 110 if the received signal CQM is acceptable.

Coordinated transmission on the uplink will now be considered. In the ensuing description, it is assumed that single carrier orthogonal frequency division multiple access (SC-OFDMA) is used for UL transmissions. It is also assumed that the eNB, the RNs, and the UE have $J_B$, $J_R$, and $J_U$ transmit/receive antennas, respectively. Furthermore, it is assumed that there are L RNs coordinating the UL transmissions with the UE. The ensuing formulations can be easily extended to any arbitrary number of transmit antennas at the eNB, UE, and RNs and to transmission techniques other than SC-OFDMA.

A block of k information bits, $a = \{a_0, a_1, \ldots, a_{k-1}\}$, are to be transmitted from the UE to the eNB. As mentioned above, the eNB may receive the information from both the RNs and the UE if the eNB determines that the signal reception quality can be significantly improved. In such a scenario, the eNB sends information to the RNs which are cooperating with the UE beforehand. The RNs can get the resource scheduling information by listening to the PDCCH or R-PDCCH based on whether (1) it is a concurrent transmission with the UE's retransmissions using the same resources or (2) it is the first transmission or a concurrent transmission with the UE's retransmission using different resources, respectively.

At the UE, the information bits, $a=\{a_0, a_1, \ldots, a_{k-1}\}$, are encoded by the turbo encoder to create P different versions of the code words of n bits, $b_i$, i=0, 1, ..., P−1, where k/n is the code rate. The coded information bits of the $i^{th}$ code word, $b_i=\{b_i^0, b_i^1, \ldots, b_i^{n-1}\}$ are scrambled and converted into a block of $n_s$ M-ary modulation symbols, $s_i$, where $$n_s = \frac{n}{\log_2 M}.$$

Figure 10:
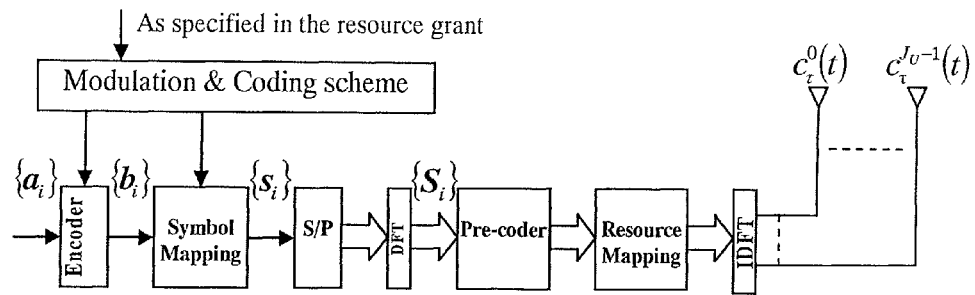
FIG. 10 is a diagram of a UE transmitter model, according to an embodiment of the disclosure.

An $n_s$-point discrete Fourier transform (DFT) is employed on the symbol vector to result in frequency domain sample vector $S_i$. The resulting sample vector is optionally pre-coded and resource mapped to the allocated resource elements (REs) within an uplink SC-OFDMA subframe. The time domain baseband signal for the $J^{th}$ antenna and $\tau^{th}$ SC-OFDMA symbol, $c_\tau^j(t)$, is generated as shown in FIG. 10.

The M-ary modulation scheme and the coding scheme used for the initial information transmission by the UE are in accordance with the resource grant sent by the eNB. Further, the eNB may also send a separate resource grant to all the cooperating RNs giving specific instructions to conditionally relay the initial information received from the UE in a specific LTE subframe using pre-assigned over-the-air resources. As noted above, the resource grant for an RN's transmission may be a soft grant, i.e., a cumulative grant for multiple UEs, which are assisted by the RN. The RN may schedule a particular UE's data transmission using these resources based on the required packet delay budget.

Figure 11:
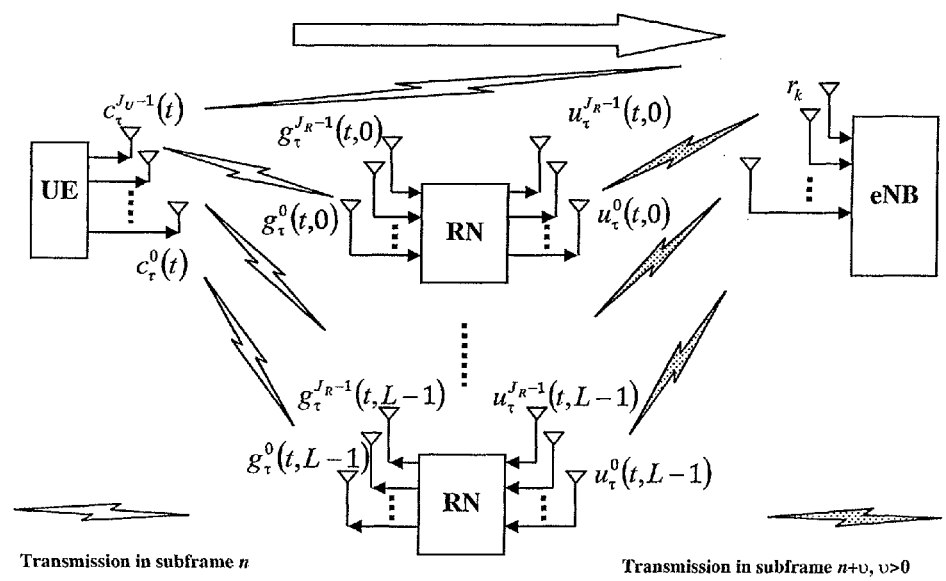
FIG. 11 is a diagram of coordinated transmission from a UE and a plurality of relay nodes, according to an embodiment of the disclosure.

The RNs may relay the initially received information from the UE to the eNB after v subframes concurrently. As shown in FIG. 11, the eNB is effectively getting information from $N_A=LJ_R$ antennas in the $(n+v)^{th}$ subframe, if all the L RNs cooperatively transmit. After the first transmission, all the subsequent retransmissions from the RNs and the UE may be concurrent. For the retransmission, the eNB is effectively getting information from $N_A=J_U+LJ_R$ antennas.

Figure 12:
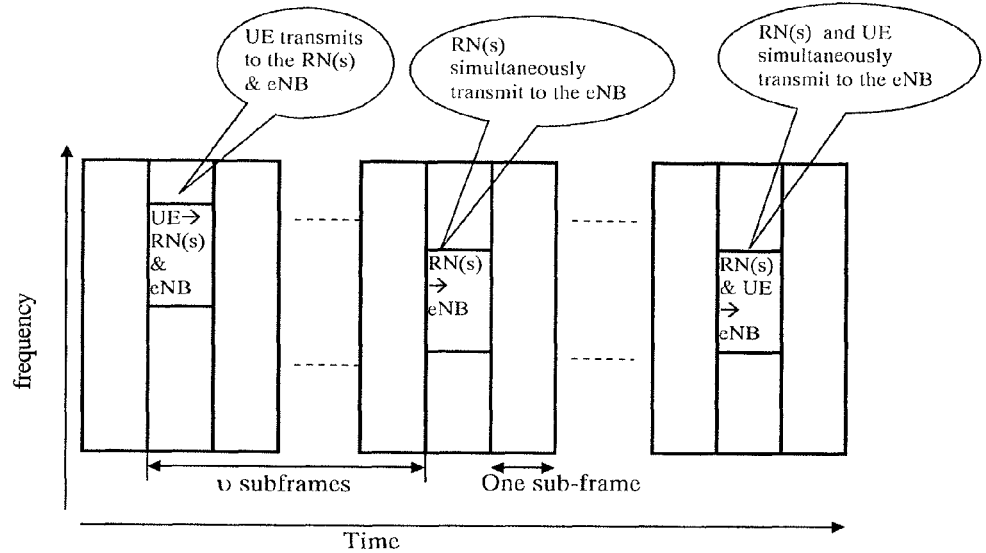
FIG. 12 is a diagram of frequency-time synchronous transmission from one or more relay nodes to an eNB, according to an embodiment of the disclosure.
Figure 13:
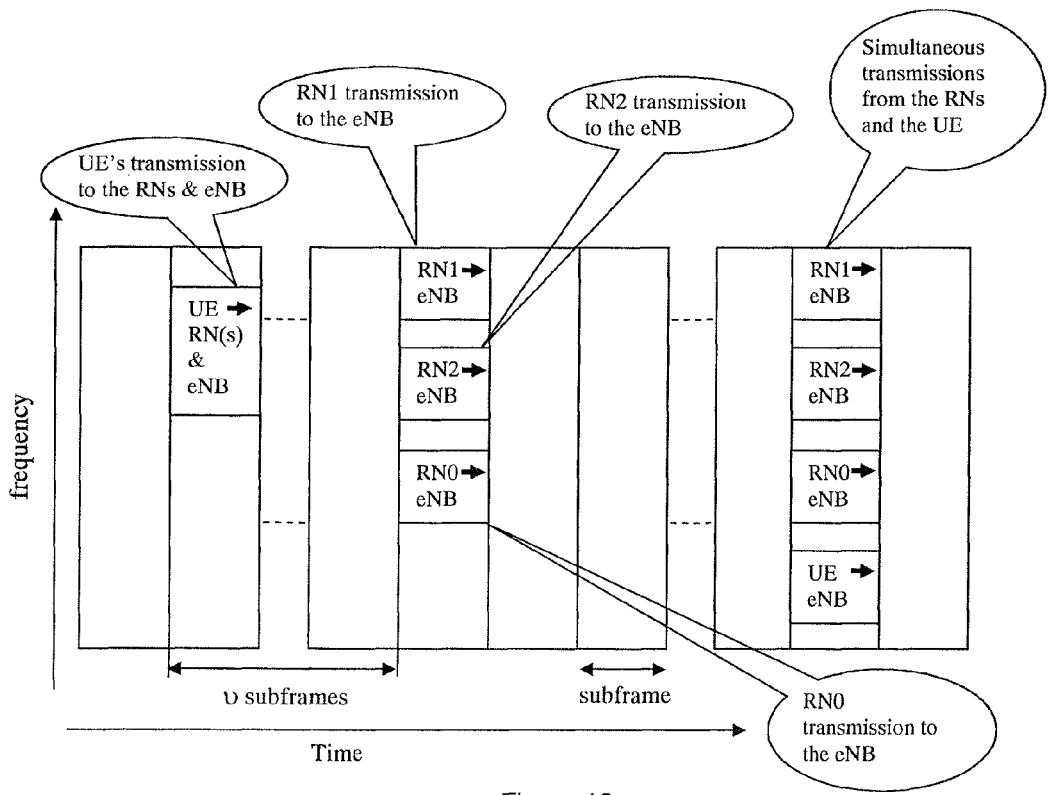
FIG. 13 is a diagram of time synchronous transmission from a plurality of relay nodes to an eNB on different frequency-time resources, according to an embodiment of the disclosure.

Assuming that the UE transmitted a packet during the $n^{th}$ subframe, the RNs may relay the demodulated/decoded and re-encoded/modulated packet during the $(n+v)^{th}$ subframe in different ways, depending on the CQM scheme. Under the first CQM scheme, in one scenario, the RNs may use the same frequency-time resources (subcarriers) in the $(n+v)^{th}$ subframe to relay the information. This is shown in FIG. 12. Under the second CQM scheme, the RNs may transmit the information in the $(n+v)^{th}$ subframe using different frequency-time resources, as depicted in FIG. 13.

The packet relayed by the RNs may use space-frequency (or space-time) or distributed coding to give cooperative gain at the eNB. The modulation and coding scheme (MCS) selection may be different under the two CQM schemes. For the first CQM scheme, the symbol vector $S_i = \{S_i^0, S_i^1, \ldots, S_i^{n_s-1}\}$ may be space-frequency block coded (SFBC) to form $N_A$ frequency domain sample vectors, $\{S_i(0), S_i(1), \ldots, S_i(N_A-1)\}$. ($S_i(\ldots)$ is a symbol vector of length $n_f$ resulting in an STC code rate of $n_s/n_f$. The overall information rate is $k/n_f \log_2 M$.) The SFBC encoder may assume $N_A=LJ_R$ or $N_A=J_U+LJ_R$ transmit antennas, forming $N_A$ SFBC encoded words. The eNB and the cooperating RNs transmit the $N_A$ symbol vector to the UE concurrently. The M-ary modulation and the coding scheme used in this transmission are in accordance with the eNB's resource grant. The eNB may decide the MCS for the relay transmission based on the signal reception quality of the concurrent transmissions from the RNs or the RNs and UE.

For the second CQM scheme, the RNs may be instructed to use different code words, $b_i$, so that the eNB can achieve the best performance by performing incremental redundancy (IR) combining. The M-ary modulation and the coding scheme used in this transmission may be signaled to the RNs by the eNB during the resource grant. Normally, the MCS may be determined by the eNB by observing the signal reception quality of the concurrent transmission from the UE and the RNs over the air interface.

In the second CQM scheme, where concurrent transmissions use different frequency-time resources, there are at least two different ways to decide the MCS for the cooperative transmission from multiple nodes. Since the transmissions from different nodes use different frequency-time resources, the MCS can be selected individually for each communication link. Alternatively, one MCS can be selected based on the average packet detection performance resulting from the concurrent transmissions.

When the modulation and coding scheme is selected based on the average receive quality, there are some advantages such as efficient control channel bandwidth utilization (assuming that the frequency-time resources used by different nodes are sequential). That is, one MCS can be indicated in a common resource grant. To further reduce the control channel bandwidth, the resource grants for each cooperating node may be sequential.

Since it is assumed that the cooperative HARQ described herein is completely transparent to the UE, the eNB can send one resource grant for the UE's retransmission and another resource grant to all other cooperating nodes (RNs). If the resource grant to the RNs is sent using the "Resource allocation type 2" as defined in 3GPP TS 36.213, the resource grant can carry only the starting point of the allocation, i.e., the resource block (RB) start for each node, and need not include the length of the allocation for all the cooperating RNs. Furthermore, if the cooperating nodes are pre-ordered, then the resource assignment need not consist of the node identity. This optimization can also be used for the case when different MCSs are used for each node's transmissions, but the MCS may need to be signaled for each node.

Figure 14:
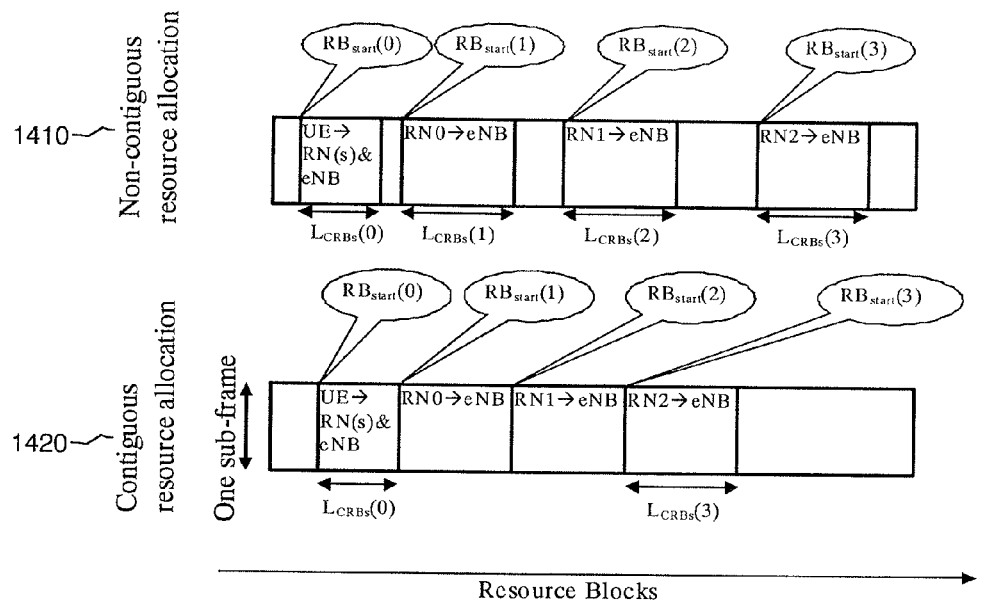
FIG. 14 is a diagram of an example format of a resource allocation grant for cooperating nodes, according to an embodiment of the disclosure.

FIG. 14 depicts the advantage of this contiguous resource allocation for the cooperating nodes. It can be seen that, in the previous non-contiguous resource allocation procedure 1410, a starting point and a length need to be specified for each separate allocation. In the contiguous resource allocation embodiment 1420 described herein, only the starting point needs to be specified, thus reducing the signaling overhead for resource grants.

Figure 15:
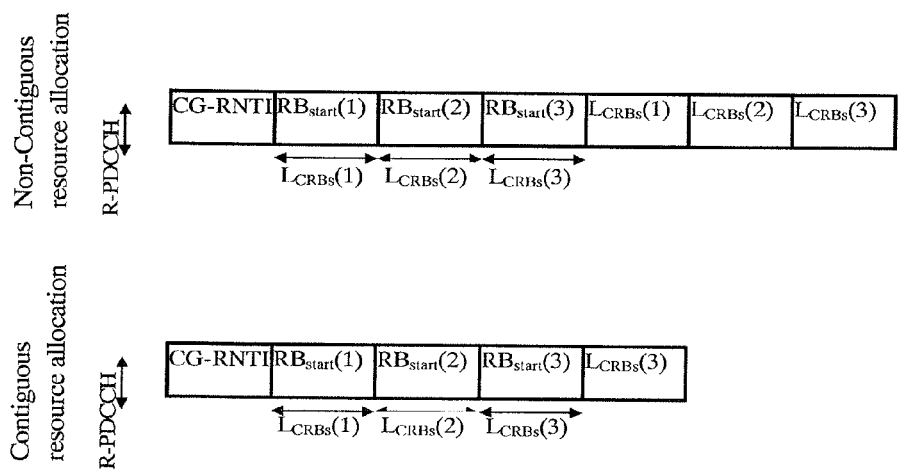
FIG. 15 is a diagram of an R-PDCCH format for non-contiguous and contiguous resource grants for relaying, according to an embodiment of the disclosure.

Another advantage with this type of contiguous resource allocation is that the complexity of the resource scheduler at the eNB may decrease. When the resource grant is sent to the RNs in the R-PDCCH, one R-PDCCH can be sent to all the cooperating RNs. This can be efficiently done by assigning a cooperating group Radio Network Temporary Identifier (CG-RNTI) for the cooperating set of the network nodes. FIG. 15 illustrates the structure of the R-PDCCH for the two schemes: non-contiguous and contiguous resource allocation for an RN's relay transmissions.

Figure 16:
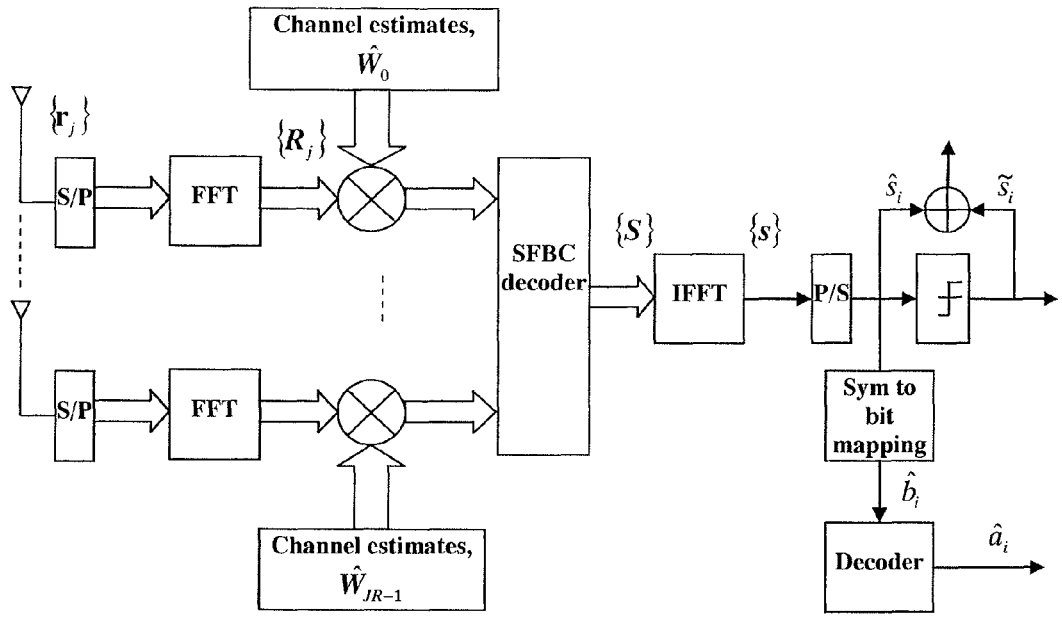
FIG. 16 is a diagram of an SC-OFDMA receiver structure with receive diversity, according to an embodiment of the disclosure.

As mentioned above, in an embodiment, a transmission from an intermediate node, such as an RN, to an eNB can include a measurement related to the reliability of information received from the UE. This measurement is referred to herein as the Channel Quality Measurement (CQM). CQM is dependent on the type of receiver at the RN. In THE FOLLOWING EXAMPLE, IT IS ASSUMED THAT THE UE TRANSMITS INFORMATION USING $J_U$ TRANSMIT antennas and the RN receives information using $J_R$ antennas. One possible receiver structure is depicted in FIG. 16. It is assumed that the information symbols are SFBC coded at the UE across the transmit antennas. As shown, the received SC-OFDMA symbol received over the $j^{th}$ receive antenna, $r_j$, is converted into the frequency domain and multiplied with the frequency domain channel equalizer coefficients before being SFBC decoded.

In the following example, it is assumed that the RN estimates the transmitted symbols s, ŝ by minimizing the mean square error $E[\|\hat{s}-s\|^2]$, where $E[\ldots]$ is the expectation operator. ŝ is the soft estimate of the transmitted M-ary symbols, which are estimated as follows:

$$\hat{s} = \mathfrak{F}^{-1}\left(\sum_{j=0}^{J_R-1} W_j R_j\right) \quad (1)$$

where $\mathfrak{F}$ represents the Fourier transform operation, $W_j$ represents the coefficients of the frequency domain equalizer for the $j^{th}$ receive antenna, and $R_j$ represents the received SC-OFDMA symbol over the $j^{th}$ receive antenna.

In one example, an RN may estimate the CQM as the post-detected SINR over symbol l, $c_l$, as follows:

$$c_l = \frac{1}{|\tilde{s}_l - \hat{s}_l|^2} \quad (2)$$

where $\tilde{s}_l = Q[\hat{s}_l]$. $Q[\ldots]$ is the quantization function which maps the soft symbol to the M-ary QAM constellation points.

An RN may divide the packet into $n_s/\sigma$ segments, where each segment consists of $\sigma$ demodulated symbols. An RN may calculate the mean squared error over each segment, $c_m$, as follows:

$$c_m = \frac{\sigma}{\sum_{l=0}^{\sigma-1} \|\tilde{s}_{l+m\sigma} - \hat{s}_{l+m\sigma}\|^2} \text{ for } m = 0, \ldots, \frac{n_s}{\sigma} - 1 \quad (3)$$

and the overall CQM of the packet is calculated as follows:

$$c = \frac{n_s}{\sum_{l=0}^{n_s-1} \|\tilde{s}_{l+m\sigma} - \hat{s}_{l+m\sigma}\|^2}$$

$c_m$ in equation (3) is equivalent to CQM defined in equation (2) averaged over $\sigma$ demodulated symbols. Here it is assumed that $n_s$ is divisible by $\sigma$. If $\sigma=n_s$, then the CQM is derived for the whole packet. In general, the RN may append $n_s/\sigma$ CQM values, $\{c_m, m=0, \ldots, n_s/\sigma-1\}$ to the relayed packet. Alternatively, each segment of the packet is individually power controlled based on the CQM corresponding to that segment.

Based on the channel quality metric, an RN may take various decisions. The case where CQM c is greater than $C_{L1}$ (the larger of the two thresholds described with respect to FIG. 6) can be referred to as Case 0. In Case 0, the RN transmits the estimated M-ary symbols with transmit power adjusted based on $C_m$. Alternatively, the relayed packet is appended with the CQM values, $\{c_m, m=0, \ldots, n_s/\sigma-1\}$. The case where CQM c is not greater than $C_{L1}$ but is greater than $C_{L2}$ (the smaller of the two thresholds described with respect to FIG. 6) can be referred to as Case 1. In Case 1, the RN decodes the estimated coded bits and re-encodes/modulates and power controls the transmission based on the log-likelihood ratios (LLRs)/soft bits obtained during the decoding process. The case where CQM is not greater than $C_{L2}$ can be referred to as Case 2. In Case 2, the RN does not transmit the received information bits. Instead, the RN may listen to the transmission from the other nodes at time $t_2$.

Figure 17:
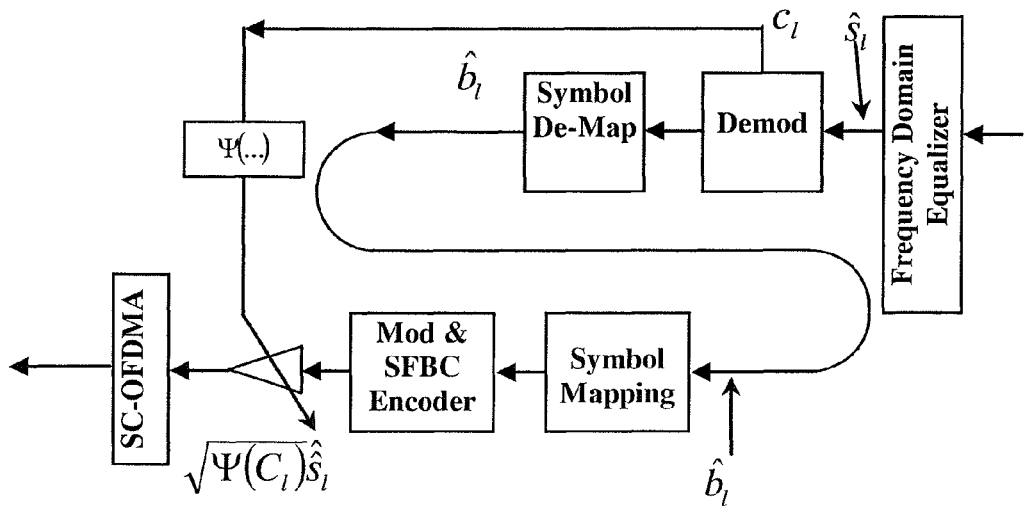
FIG. 17 is a diagram of coordination among relay nodes and a UE with demodulate and forward, according to an embodiment of the disclosure.
Figure 18:
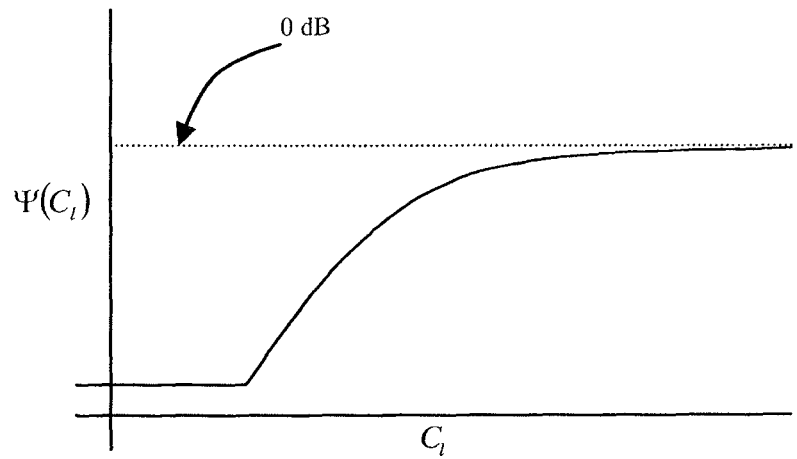
FIG. 18 is a diagram of an example of the power adjustment function $\psi$, according to an embodiment of the disclosure.

In Case 0, as shown in FIG. 17, the RN may not decode the packet. Instead, the RN quantizes the estimated symbols and modulates the carrier and synchronously transmits to the eNB along with the other cooperating nodes. The power of the transmitted packet (in part or whole) is set as $\psi(c_m)$ relative to the transmit power of the other cooperating nodes and the relative path loss differences between the eNB and the RN and between the eNB and the UE, where $\psi(\ldots)$ may be a monotonically increasing function, as shown in FIG. 18. The illustration in FIG. 17 corresponds to a case where $\sigma$ is set to $n_s$.

The UE and the RN(s) may concurrently transmit spatially encoded symbols using the same radio resources to the eNB as shown in FIG. 12. Optionally, the UE and the RN may concurrently transmit the encoded symbols to the eNB with a random transmission delay (i.e., the symbols transmitted by each antenna of each node are not spatially encoded in this case). The random transmission delay should preferably not be more than the cyclic prefix minus the expected maximum channel dispersion. The advantage of including randomly delayed signals from different nodes is to exploit the frequency selectivity at the receive end.

Figure 19:
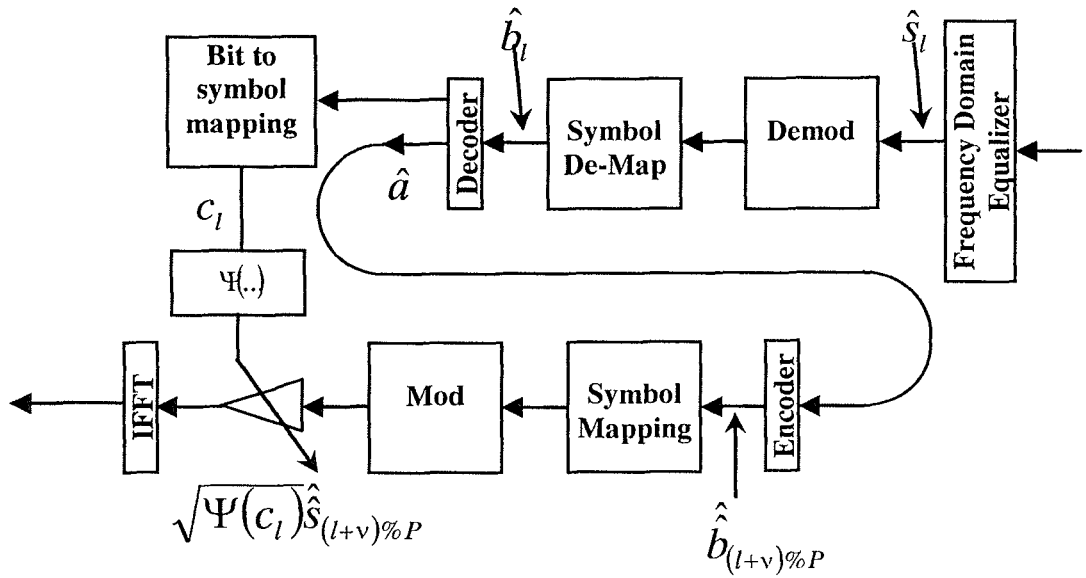
FIG. 19 is a diagram of coordination among relay nodes and a UE with demodulate/decode and forward, according to an embodiment of the disclosure.

In Case 1, the RN may demodulate and decode the received signal, encode and modulate the detected bits again, map the symbols onto the UL OFDMA subframe of the eNB's choice, and forward the symbols to the eNB. The eNB may indicate to the RN the subframe and exact REs the RN should use to transmit the information on the UL. Further, as shown in FIG. 19, each RN demodulates the received information from the UE to get an estimate of the transmitted symbols, $\hat{s}_l$, and decodes the data to obtain the information bit, â, and then re-encodes and modulates the carrier. The forward error correction (FEC) encoding employed by the RN is indicated by the eNB. As indicated in FIG. 19, the codeword received by the RN is $\{b_l\}$ and the transmitted code word (based on the decoded information bits) by the RN is $b_{(l+v) \% P}$, where x % y=mod(x,y). The carrier modulated by the re-encoded information is relayed to the eNB. The transmission is power controlled according to the decoder quality metric, $c_m$. This will provide performance gains if the channel conditions between the RN and the eNB are not good. This is one way to get soft combining gain from the concurrent transmissions from the eNB and the RNs. It should be noted that the eNB may set v to '0' if the concurrent transmission scheme depicted in FIG. 12 is used (i.e., the concurrent transmission using the same frequency-time resources). If the IR combining gain is required at the eNB, a different v ≠0 is signaled to the RN. That is, the transmission scheme depicted in FIG. 13 is used. Alternatively, v could be a pre-defined number or could be defined by a formula, in which cases there would be no need for signaling. Various combinations are possible based on the eNB's receiver capabilities.

Figure 20:
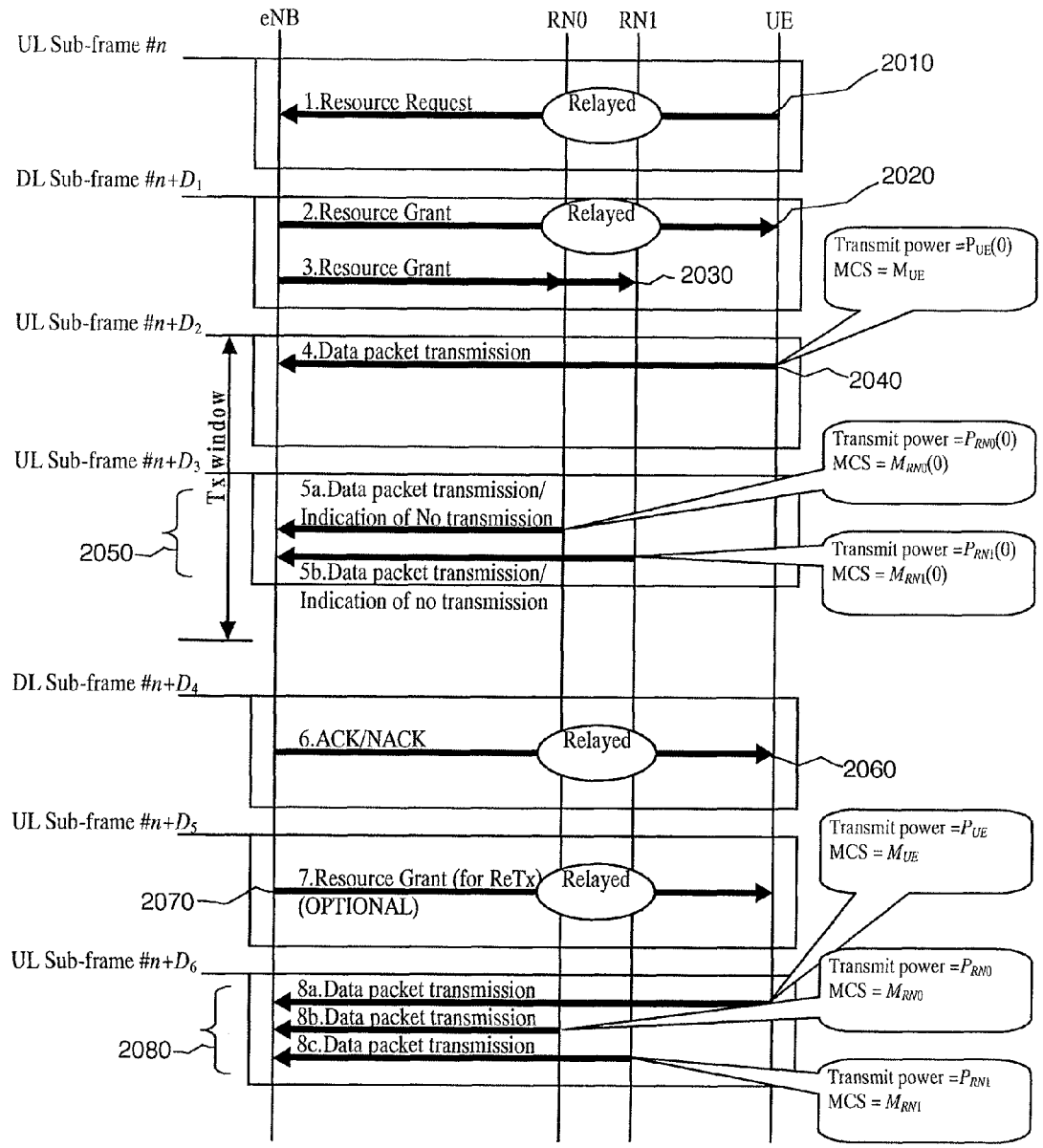
FIG. 20 is a diagram of a call flow for cooperative HARQ transmission on the uplink, according to an embodiment of the disclosure.
Figure 21:
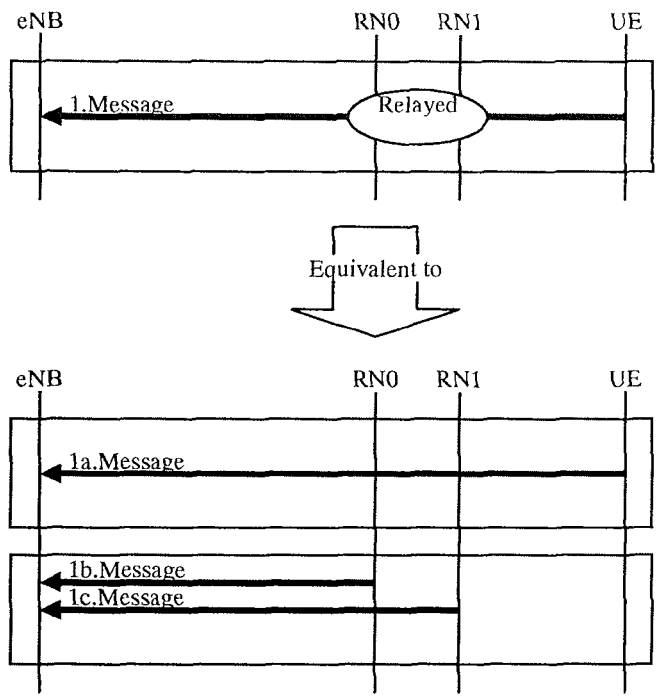
FIG. 21 is a diagram of a relay of uplink messages to an eNB, according to an embodiment of the disclosure.

Adaptation of the link parameters will now be considered. FIG. 20 shows an embodiment of a call flow between the coordinating nodes: an eNB, a plurality of RNs, and a UE. Each message is sent with proper transmit power and modulation and coding scheme. At event 2010, the UE sends resource request to the eNB whenever there is a need to send data. This message is also received by the RNs. The RNs may relay the message to the eNB. The signal relaying over the UL is performed as shown in FIG. 21.

It is assumed that the resource request is sent by the UE over the random access channel. Similarly, the RNs may relay the resource request message over the random access channel (identifying the UE). In this case, the eNB does not need to specifically assign resources for the relays. This method is easily extendable to a case where the resource request is sent over the physical uplink shared channel (PUSCH).

Figure 22:
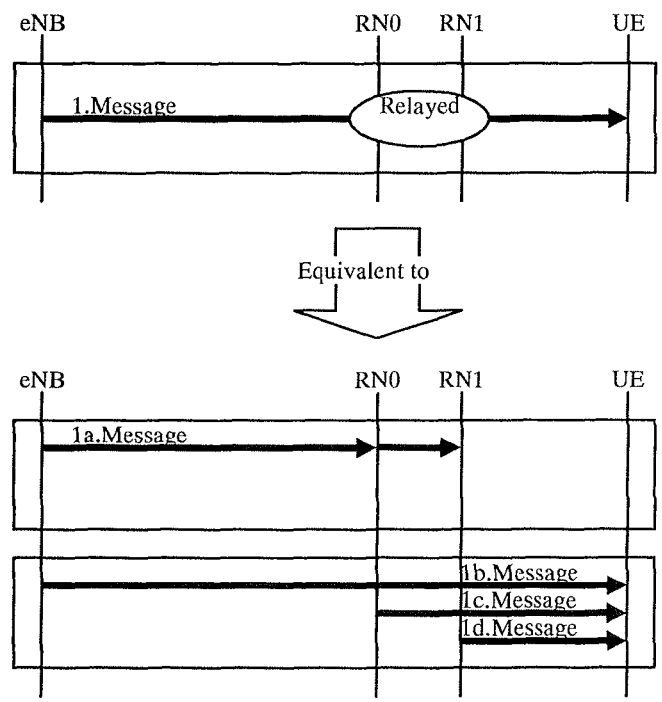
FIG. 22 is a diagram of a relay of downlink messages to an eNB, according to an embodiment of the disclosure.

At event 2020, the eNB sends resource grant to the UE in the PDCCH. This message may also be relayed to the UE by the RNs concurrently with the eNB transmission. The signal relaying over the downlink is performed as shown in FIG. 22. As shown, the resource grant is broadcasted to the RNs in advance in the R-PDCCH. Subsequently, the message is sent to the UE concurrently over the same subframe. If this transmission is sent to the UE transparently (i.e., the UE is not aware of the presence of the relay nodes assisting the network), the PDCCH may be sent from the eNB and the RNs using the same physical resources.

At event 2030, the eNB sends a separate resource grant to the RNs in the R-PDCCH. These granted resources are for the RNs to relay the received packet from the UE to the eNB, if the RN is confident of the receive quality of the packet. As described in the above discussion on coordinated transmission on the uplink, one R-PDCCH is transmitted addressing cooperating group of RNs (CG-RNTI) to assign the resources for all the cooperating RNs.

Figure 23:
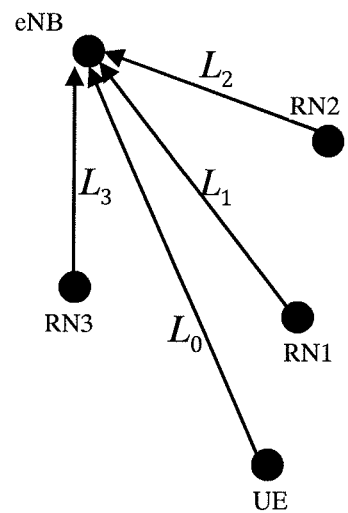
FIG. 23 is a diagram of path loss between a plurality of relay nodes, a UE, and an eNB, according to an embodiment of the disclosure.

At event 2040, the UE transmits the data packet to the eNB using the resources granted by the eNB. The transmit power of the data packet in the subframe i, $P_{UE}(i)$, is set such that the path loss between the UE and eNB is fully or partially compensated:

$$P_{UE}(i)=\min \{P_{UE_{MAX}}, P_0+10\log_{10}(M_{RB\_UE})+\alpha L_0+\Delta_{TF}(i)+f(i)\} \quad (4)$$

where $P_0$ is the average receive power per RE advertised by the eNB (further relayed by the RNs), $L_0$ is the path loss between the eNB and the UE (as depicted in FIG. 23), $\alpha$ is the fractional compensation parameter advertised by the eNB (cell specific), $\Delta_{TF}(i)$ is the UE-specific power adjustment controlled by eNB, f(i) is the UE-specific closed loop power control parameter (the eNB sends this adjustment in the PDCCH), $P_{UE\_MAX}$ is the maximum transmit power of the UE, and $M_{RB\_UE}$ represents the number of RBs assigned to the UE in the $i^{th}$ subframe.

The received power at the eNB can be expressed as:

$$P_{eNB\_RX}(i)=P_{UE}(i)-L_0 \quad (5)$$

At event 2050, RN-j may relay the received packets from the UE to the eNB during the $(i+v)^{th}$ subframe, if the CQM of the received packets is acceptable. The power of the transmission is adjusted such that the relayed packet does not corrupt the original transmission from the UE:

$$P_{RN-j}(i+v)=\min\{P_{RN\_MAX}, P_0+10\log_{10}(M_{RB\_RN})+\alpha L_j+\Delta_{TF}(i+v)+f(i+v)\} \quad (6)$$

where $L_j$ is the path loss between the eNB and RN-j (as depicted in FIG. 23), $\Delta_{TF}(i)$ is the RN-specific power adjustment controlled by the eNB, f(i) is the RN-specific closed loop power control parameter (the eNB sends this adjustment in the PDCCH), $P_{RN\_MAX}$ is the maximum transmit power of the RN, and $M_{RB\_RN}$ represents the number RBs assigned to the RN transmission during the $(i+v)^{th}$ subframe.

Under the first CQM scheme, the RNs may cooperatively transmit over the same frequency-time resources. In the case of multiple RNs transmitting the information concurrently using the same frequency-time resources, the transmit power is set as follows:

$$P_{RN-j}(i+v)=\min \{P_{RN_{MAX}}, P_m-L_m+L_j+\psi_j(CQM)\} \quad (7)$$

When the CQM of the received packet is excellent, $\psi_j(CQM)$ is set to '0'. As shown in FIG. 18, the function $\psi_j(CQM)$ is a monotonically increasing function with CQM. When the CQM is low, $\psi_j(CQM)$ becomes a negative value, resulting in a reduction of transmit power. $P_m$ represents the transmit power of the node m that has the best CQM over the packet reception from the UE. Here "node" refers to any of the cooperating RNs.

Under the second CQM scheme, the RNs may cooperatively transmit over different frequency-time resources. When the RNs and the UE are concurrently transmitting over different resources, the transmit power settings of the UE and the RNs are set according to equations (4) and (6), respectively. Further, the RNs may send an indication that the packet is not being transmitted if the CQM of the received packet from the UE is not acceptable. This helps the eNB to prepare an ACK/NACK based on the reception from the UE's initial transmission.

For this relayed transmission from the cooperating RNs, the eNB may grant resources to the RNs in advance. These resources are in general granted for relaying the data/control packets such that the RNs can use these resources for forwarding the data/control packets from the UEs whom they are cooperating with. Therefore, these resource grants may not be UE-specific. The eNB may also indicate a time before which the packet has to be transmitted to the eNB. If an RN cannot relay the packet before this time, the RN need not transmit the packet. It is the RN's responsibility to send the first transmission before the deadline.

At event 2060, the eNB sends an ACK/NACK after checking the CRC of the received packet. This message may also be received by the RNs and may be concurrently relayed to the UE. At event 2070, if the CRC of the received packet did not pass, then the eNB sends a resource grant to the UE again, specifying the MCS and power adjustment. The MCS of the retransmission can be different from that of the previous transmissions. The resource grant at event 2070 is required only for an asynchronous HARQ scheme. For a synchronous HARQ scheme, the UE retransmits the packets periodically at a predefined interval. For example, for LTE, the UE retransmits the packet every $8^{th}$ subframe in the event of a NACK.

At event 2080, the UE and the RNs concurrently transmit the packet to the eNB with the adjusted power setting and MCS. The transmit power settings of the various nodes are dependent on the type of concurrent transmission configured by the eNB. When the RNs and the UE are concurrently transmitting over the same frequency-time resources, the transmit power settings are set according to equation (7).

If the transmit power of the UE is set to its maximum power (i.e., power saturation), then the RN transmit power is set by selecting the nodes which have the best CQM as the reference power level, and equation (7) is used to set the transmit power level of the $j^{th}$ node. Otherwise, the transmit power of the RNs is set with respect to the transmit power of the UE, again using equation (7).

When the RNs and the UE are concurrently transmitting over different resources, the transmit power settings of the UE and the RNs are set according to equations (4) and (6), respectively.

Figure 24:
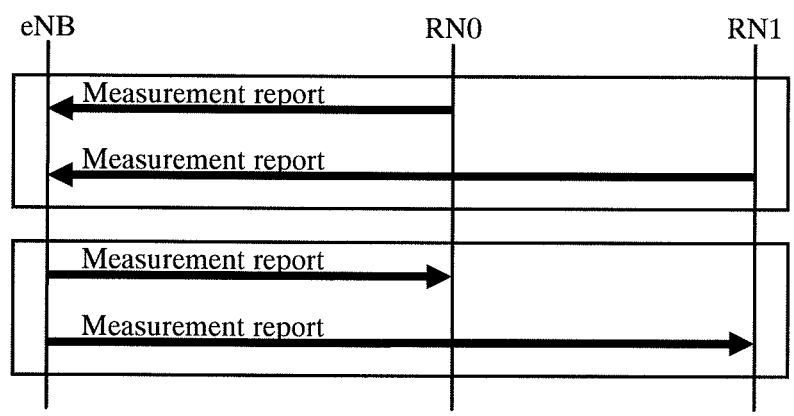
FIG. 24 is a diagram of measurement reporting between nodes, according to an embodiment of the disclosure.

As described in the previous paragraphs, for the first CQM scheme, an RN's transmit power is set based on another RN's and/or the UE's transmit power levels and the corresponding CQM. Therefore, the RNs need to know the other cooperating node's transmit power level. Furthermore, each RN should know whether the UE is operating at its maximum transmit power level. Therefore, there is a need for RNs and the eNB to exchange measurement reports as shown in FIG. 24. The measurement report from an RN may include the path loss measurement with respect to the other nodes (including the other RNs), the maximum transmit power level, and/or the maximum power level of the UEs attached to that node. The measurement report from the eNB may include power adjustment parameters and power control parameters.

The cooperating RNs on the uplink are decided by the quality of the sounding reference signal/random access channel (SRS/RACH) reception by the nodes. Similarly, the cooperating RNs on the downlink are decided by the quality of the common reference signal (CRS) reception by the RNs. Furthermore, node cooperation also depends on the availability of radio resources at a particular node (i.e., system load).

In summary, a novel HARQ mechanism for uplink cooperative multi-hop communication is provided to optimize over-the-air packet delay. The mechanism is equally applicable to synchronous and asynchronous HARQ transmission schemes. More specifically, smart/opportunistic relaying using half-duplex relays is provided to enable cooperative communication advantages at the eNB. Also, efficient over-the-air cooperation mechanisms are provided. In addition, the cooperative HARQ mechanism is enabled using a newly defined CQM. Higher layer signaling is also provided to enable the proper transmit power control at the cooperating nodes for maximizing performance.

The description provided herein is in general applicable to both the L2 (Type 2) and L3 (Type 1) relay architectures as being discussed in 3GPP/LTE. Furthermore, the presented techniques are easily applicable to in-band/out-of-band relays (i.e., Type 1a and Type 1b). Similarly, the techniques are equally applicable to any wireless network enabled with fixed/nomadic/mobile relay nodes.

Further, the cooperative relaying techniques presented herein may be related to coordinated multi-point (COMP) transmission and reception techniques as defined in 3GPP TS 36.814. Cooperative communication from multiple nodes can be achieved in different ways. In this disclosure, at least six cooperative scenarios are addressed. In a first scenario, more than one node may concurrently transmit the same information packet to a destination node. In a second scenario, space-time/space-frequency may be applied (i.e., transmissions from different nodes use the same frequency-time resources) across different transmissions to achieve transmission diversity gain at the destination node. In a third scenario, any type of distributed coding (for example, distributed trellis coding or algebraic coding) may be applied across different transmissions to achieve coding gain at the destination node. In a fourth scenario, all the cooperating nodes may transmit information over different frequency-time resources using different FEC coding employing the same or different MCS. In a fifth scenario, all the cooperating nodes may transmit different parts of the same information packet to obtain improved throughput at the destination node. In a sixth scenario, all the cooperating nodes' transmissions are coordinated such that inter-node interference is reduced.

Figure 25:
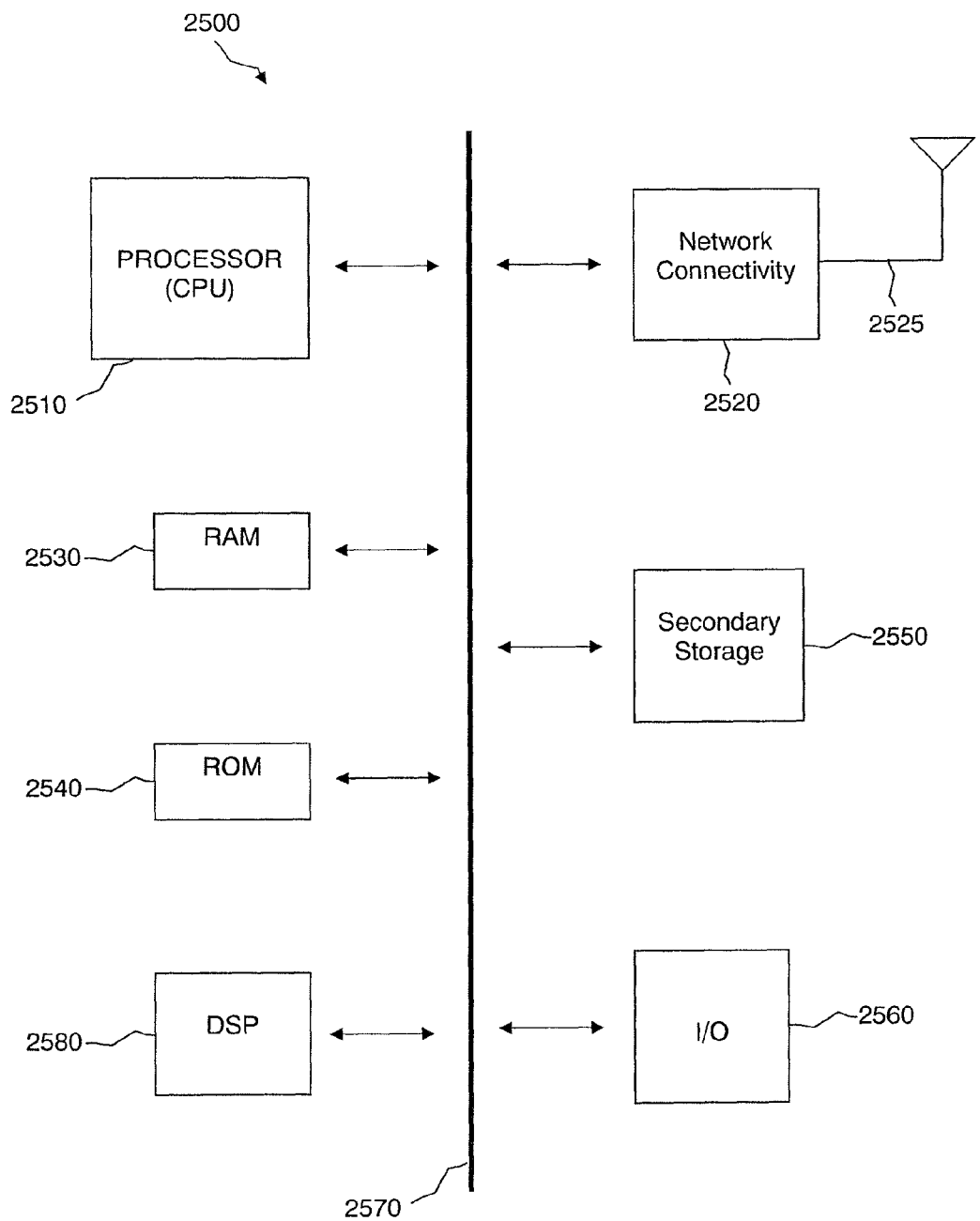
FIG. 25 illustrates an example of a system that includes a processing component suitable for implementing one or more embodiments disclosed herein.

The UEs, RNs, eNBs, and other components described above might include a processing component that is capable of executing instructions related to the actions described above. FIG. 25 illustrates an example of a system 2500 that includes a processing component 2510 suitable for implementing one or more embodiments disclosed herein. In addition to the processor 2510 (which may be referred to as a central processor unit or CPU), the system 2500 might include network connectivity devices 2520, random access memory (RAM) 2530, read only memory (ROM) 2540, secondary storage 2550, and input/output (I/O) devices 2560. These components might communicate with one another via a bus 2570. In some cases, some of these components may not be present or may be combined in various combinations with one another or with other components not shown. These components might be located in a single physical entity or in more than one physical entity. Any actions described herein as being taken by the processor 2510 might be taken by the processor 2510 alone or by the processor 2510 in conjunction with one or more components shown or not shown in the drawing, such as a digital signal processor (DSP) 2502. Although the DSP 2502 is shown as a separate component, the DSP 2502 might be incorporated into the processor 2510.

The processor 2510 executes instructions, codes, computer programs, or scripts that it might access from the network connectivity devices 2520, RAM 2530, ROM 2540, or secondary storage 2550 (which might include various disk-based systems such as hard disk, floppy disk, SIM (subscriber identity module) card, or optical disk, or other storage device). An application or other computer usable program code may be stored on any of these devices, or on some other storage device. While only one CPU 2510 is shown, multiple processors may be present. Thus, while instructions may be discussed as being executed by a processor, the instructions may be executed simultaneously, serially, or otherwise by one or multiple processors. The processor 2510 may be implemented as one or more CPU chips.

The network connectivity devices 2520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 2520 may enable the processor 2510 to communicate with the Internet or one or more telecommunications networks or other networks from which the processor 2510 might receive information or to which the processor 2510 might output information. The network connectivity devices 2520 might also include one or more transceiver components 2525 capable of transmitting and/or receiving data wirelessly.

The RAM 2530 might be used to store volatile data and perhaps to store instructions that are executed by the processor 2510. The ROM 2540 is a non-volatile memory device that typically has a smaller memory capacity than the memory capacity of the secondary storage 2550. ROM 2540 might be used to store instructions and perhaps data that are read during execution of the instructions. Access to both RAM 2530 and ROM 2540 is typically faster than to secondary storage 2550. The secondary storage 2550 is typically comprised of one or more disk drives or tape drives and might be used for non-volatile storage of data or as an over-flow data storage device if RAM 2530 is not large enough to hold all working data. Secondary storage 2550 or may be used to store programs that are loaded into RAM 2530 when such programs are selected for execution.

The I/O devices 2560 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 2525 might be considered to be a component of the I/O devices 2560 instead of or in addition to being a component of the network connectivity devices 2520.

In an embodiment, a method for communication in a wireless network is provided. The method includes a relay node receiving a data packet and determining whether to transmit the packet without performing error checking.

The relay node might measure a CQM based on the received packet and might modify the transmission of the packet to an access node based on the CQM. If the CQM is not below a first threshold, the relay node might demodulate, decode, re-encode, and re-modulate the packet. If the CQM is not below a first threshold but is below a second threshold, the second threshold being greater than the first threshold, the relay node might demodulate, decode, re-encode, and re-modulate the packet, and, if the CQM is not below the first threshold and is not below the second threshold, the relay node might demodulate and re-modulate the packet but might not decode and re-encode the packet. If the relay node has previously attempted to transmit the packet or if the transmission of the packet cannot occur at a scheduled subframe that is earlier than a packet transmission deadline as specified by the access node, the relay node might transmit the packet concurrently with an earliest retransmission of the same packet from a UE or with an earliest transmission of the same packet from another relay node, if the packet reception is not acknowledged by the access node. The concurrent transmissions from the UE and/or the relay node might be spatially encoded and might transmitted using the same radio resources to the access node. The concurrent transmissions from the UE and/or the relay node might use different code words and might be transmitted using different radio resources so that the access node can achieve the best performance by performing IR combining. The concurrent transmissions from the UE and/or the relay node might use same code words and might be transmitted using different radio resources so that the access node can achieve the best performance by performing maximal ratio combining.

In another embodiment, a relay node in a wireless network is provided. The relay node includes a processor configured such that the relay node receives a data packet and determines whether to transmit the packet without performing error checking.

The relay node might measure a CQM based on the received packet and might modify the transmission of the packet to an access node based on the CQM. The relay node might append the CQM to the transmission of the packet to the access node, and the access node might combine the packet received from the relay node with at least one other instance of the packet received from another node, the combination of the at least two instances of the packet being weighted by the access node based on the CQM. The relay node might control the power of the transmission of the packet to the access node based on the CQM, and the packet received from the relay node and at least one other instance of the packet received from another node might be combined at the access node. The relay node might control the power of the transmission of the packet to the access node based on the CQM, and the packet received from the relay node and at least one other instance of the packet received from another node might be combined naturally over-the-air. If the CQM is below a first threshold, the relay node might not send the packet, might listen for another transmission of the same packet from another node if the packet is not acknowledged by the access node, might combine a newly received packet with the previously received packet, might calculate another CQM, and might compare the newly calculated CQM to the first threshold. If the CQM is not below a first threshold, the relay node might demodulate, decode, re-encode, and re-modulate the packet. If the CQM is not below a first threshold but is below a second threshold, the second threshold being greater than the first threshold, the relay node might demodulate, decode, re-encode, and re-modulate the packet, and, if the CQM is not below the first threshold and is not below the second threshold, the relay node might demodulate and re-modulate the packet but might not decode and re-encode the packet. If the relay node has not previously attempted to transmit the packet and if the transmission of the packet can occur at a scheduled subframe, the relay node might transmit the packet as scheduled. If the relay node has previously attempted to transmit the packet or if the transmission of the packet cannot occur at a scheduled subframe, the relay node might transmit the packet concurrently with an earliest retransmission of the same packet from a UE or with an earliest transmission of the same packet from a different relay node, if the packet is not acknowledged by the access node. The concurrent transmissions might use the same frequency-time resources or different frequency-time resources. The concurrent transmissions might have a random transmission delay that is not more than the cyclic prefix minus the expected maximum channel dispersion, if the same frequency-time resources are used for concurrent transmissions from different nodes. The concurrent transmissions from the relay nodes might be spatially encoded with the transmission from the UE and might be transmitted using the same radio resources to the access node, the spatial encoding rules might be pre-assigned by the access node. The concurrent transmissions from the relay nodes might use different code words and might be transmitted using different radio resources so that the access node can achieve the best performance by performing IR combining, and the code words to be transmitted might be pre-assigned by the access node. The concurrent transmissions from the relay nodes might use same code words and might be transmitted using different radio resources so that the access node can achieve the best performance by performing maximal ratio combining, and the code word to be transmitted might be pre-assigned by the access node. If the relay node has not previously attempted to transmit the packet and if the transmission of the packet can occur at a scheduled subframe, the relay node might transmit the packet as scheduled. If the relay node has previously attempted to transmit the packet or if the transmission of the packet cannot occur at a scheduled subframe, the relay node might transmit the packet concurrently with an earliest retransmission of the same packet from a UE or with an earliest transmission of the same packet from a different relay node, if the packet is acknowledged by the access node. The error checking procedure might be a cyclic redundancy check. The CQM of the $m^{th}$ part of the packet might be calculated during the symbol modulation according to the equation:

$$c_m = \frac{\sigma}{\sum_{l=0}^{\sigma-1} \|\tilde{s}_{l+m\sigma} - \hat{s}_{l+m\sigma}\|^2} \text{ for } m = 0, \ldots, \frac{n_s}{\sigma} - 1$$

and the overall CQM of the packet might be calculated according to the equation:

$$c = \frac{n_s}{\sum_{l=0}^{n_s-1} \|\tilde{s}_{l+m\sigma} - \hat{s}_{l+m\sigma}\|^2}$$

where $$\hat{s} = \Im^{-1}\left(\sum_{j=0}^{J_R-1} W_j R_j\right)$$

and where $\Im$ represents the Fourier transform operation, $W_j$ represents the coefficients of the frequency domain equalizer for the $j^{th}$ receive antenna, and $R_j$ represents the received SC-OFDMA symbol over the $j^{th}$ receive antenna, and where $\tilde{s}_l = Q[\hat{s}_l]$, where $Q(\ldots)$ is the quantization function which maps the soft symbol to the M-ary QAM constellation points.

The CQM of the $m^{th}$ part of the packet, $c_m$, might be calculated during the bit decoding based on the log-likelihood ratios. The access node might send the relay node and another node contiguous resource allocations for transmissions of the packet to the access node, each of the contiguous resource allocations having a specified starting point, and the relay node and the other node might use the resource allocations to transmit the packet concurrently. The contiguous resource allocations might be assigned to the relay node and the other node by means of a cooperating group radio network temporary identifier. If different frequency-time resources are used for concurrent transmission from different nodes, the power of the transmission of the packet might be controlled according to the equation:

$$P_{RN-j}(i+v) = \min\{P_{RN\_MAX}, P_0 + 10\log_{10}(M_{RB\_RN}) + \alpha L_j + \Delta_{TF}(i+v) + f(i+v)\}$$

where $L_j$ is the path loss between the access node and RN-$j$,
$\Delta_{TF}(i)$ is the RN-specific power adjustment controlled by the access node,
$f(i)$ is the RN-specific closed loop power control parameter sent by the access node in the PDCCH,
$P_{RN\_MAX}$ is the maximum transmit power of the relay node, and
$M_{RB\_RN}$ represents the number of resource blocks assigned to the relay node transmission during the $(i+v)^{th}$ subframe.

If the same frequency-time resources are used for concurrent transmission from different nodes, the power of the transmission of the packet might be controlled according to the equation:

$$P_{RN-j}(i+v) = \min\{P_{RN\_MAX}, P_m - L_m + L_j + \psi_j(CQM)\}$$

wherein, when the CQM of the received packet is excellent, $\psi_j(CQM)$ is set to '0', where the function $\psi_j(CQM)$ is a monotonically increasing function with CQM, and wherein, when the CQM is low, $\psi_j(CQM)$ becomes a negative value, resulting in a reduction of transmit power, and wherein, if a UE is not part of the concurrent transmission, $P_m$ represents the transmit power of the node m that has the best CQM over the packet reception from the UE, and wherein, if a UE is part of the concurrent transmission, $P_m$ represents the transmit power of the UE.

In another embodiment, an access node in a wireless network is provided. The access node includes a processor configured such that the access node combines a data packet received from a relay node with at least one other instance of the packet received from another node, the combination of the at least two instances of the packet being weighted by the access node based on a CQM associated with the packet.

The following documents are hereby incorporated by reference in their entirety: 3GPP TS 36.211, 3GPP TS 36.213, and 3GPP TR 36.814.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless network, comprising:
   receiving, by a first network node, a packet from a User Equipment (UE);
   measuring, by the first network node, a channel quality measurement (CQM) based on the packet; and
   controlling, by the first network node, a power of transmission of the packet to an access node based on the CQM such that if the CQM does not exceed a first threshold, the first network node controls the power of transmission based on log-likelihood ratios (LLRs)/soft bits obtained during a decoding of the packet.

2. The method of claim 1, further comprising transmitting, by the first network node, the packet to the access node without decoding the packet if the CQM exceeds the first threshold, the CQM representing a quality of a first link between the first network node and the UE.

3. The method of claim 1, further comprising appending, by the first network node, the CQM to the transmission of the packet to the access node.

4. The method of claim 2, wherein at least one other instance of the packet is received from a second network node, and wherein the packet received from the first network node and the at least one other instance of the packet received from the second network node are at least one of:
  combined at the access node; or
  combined naturally over-the-air.

5. The method of claim 2, wherein, if the CQM exceeds the first threshold, the first network node adjusts the power of transmission based on at least one of: a transmit power of other cooperating network nodes in the wireless network, or a relative path difference between the first link and a second link coupling the first network node to the access node.

6. The method of claim 1, wherein the access node combines the packet received from the first network node with at least one other instance of the packet received from a second network node.

7. The method of claim 6, wherein a combination of the at least two instances of the packet is weighted by the access node based on the CQM.

8. The method of claim 1, wherein, when the CQM is below a second threshold, the method further comprises:
  refraining, by the first network node, from sending the packet;
  listening, by the first network node, for a second transmission of the same packet from a second network node when the packet is not acknowledged by the access node;
  combining, by the first network node, a newly received packet with the packet;
  calculating, by the first network node, a second CQM; and
  comparing, by the first network node, the newly calculated CQM to the second threshold.

9. A first network node in a wireless network, comprising:
  a processor configured to:
    receive a packet from a User Equipment (UE);
    measure a channel quality measurement (CQM) based on the packet; and
    control a power of transmission of the packet to an access node based on the CQM, wherein at least one other instance of the packet is received from a second network node, and wherein the packet and the at least one other instance of the packet received from the second network node are at least one of:
    combined at the access node; or
    combined naturally over-the-air.

10. The first network node of claim 9, wherein, if different frequency-time resources are used for concurrent transmission from different network nodes, the power of the transmission of the packet is controlled according to the equation:

$$P_{RN\text{-}j}(i+v) = \min\{P_{RN\_MAX}, P_0 + 10\log_{10}(M_{RB\_RN}) + \alpha L_j + \Delta_{TF}(i+v) + f(i+v)\}$$

wherein $L_j$ is a path loss between the access node and $_{RN\text{-}}j$, wherein $\Delta_{TF}(i)$ is a RN-specific power adjustment controlled by the access node, wherein f(i) is a RN-specific closed loop power control parameter sent by the access node in a Physical Downlink Control Channel (PDCCH), wherein $P_{RN\_MAX}$ is a maximum transmit power of the first network node, and wherein $M_{RB\_RN}$ represents a number of resource blocks assigned to the first network node transmission during an $(i+v)^{th}$ subframe.

11. The first network node of claim 9, wherein, if the same frequency-time resources are used for concurrent transmission from different nodes, the power of the transmission of the packet is controlled according to the equation:

$$P_{RN\text{-}j}(i+v) = \min\{P_{RN_{MAX}}, P_m - L_m + L_j + \psi_j(\text{CQM})\}$$

wherein, when the CQM of the received packet is high, a $\psi_j(\text{CQM})$ is set to '0', wherein the function $\psi_j(\text{CQM})$ is a monotonically increasing function of the CQM, and wherein, when the CQM is low, the $\psi_j(\text{CQM})$ becomes a negative value resulting in a reduction of transmit power, wherein, if a user equipment (UE) is not part of the concurrent transmission, $P_m$ represents a transmit power of a network node m, and wherein, if a UE is part of the concurrent transmission, $P_m$ represents the transmit power of the UE.

12. The first network node of claim 9, wherein the first network node is a relay node.

13. An access node in a wireless network, comprising:
  a receiver configured to receive a packet from a first network node, wherein the first network node controls a power of transmission of the packet to the access node based on a channel quality measurement (CQM), and wherein the CQM is measured by the first network node based on the packet; and
  a processor coupled to the receiver and configured to combine the packet with at least one other instance of the packet received from a second network node.

14. The access node of claim 13, wherein the processor is further configured to weight combination of the at least two instances of the packet based on the CQM.

15. The access node of claim 13, wherein the processor is further configured to:
  grant resources for the first network node to transmit the packet in a first transmission; and
  assign a time before which the first network node is to transmit the packet in the first transmission.

16. The access node of claim 13, wherein the processor is further configured to pre-define a space time coding or a transmit delay employed across transmit antennas of the first network node and at least one cooperating user equipment.

17. The access node of claim 13, wherein the processor is further configured to:
  grant the first network node resources to send the packet in a first retransmission in case of asynchronous Hybrid Automatic Repeat Request (HARQ); and
  instruct the first network node to use resources assigned by the processor.

18. The access node of claim 17, wherein the resources are orthogonal and contiguous.

19. The access node of claim 13, wherein the first network node further controls the power of transmission based on log-likelihood ratios (LLRs)/soft bits obtained during a decoding of the packet.

20. The access node of claim 13, wherein the CQM for an $m^{th}$ part of the packet is calculated during symbol demodulation according to a first equation:

$$c_m = \frac{\sigma}{\sum_{l=0}^{\sigma-1} \|\tilde{s}_{l+m\sigma} - \hat{s}_{l+m\sigma}\|^2} \quad \text{for } m = 0, \ldots, \frac{n_s}{\sigma} - 1$$

and an overall CQM of the packet is calculated according to a second equation:

$$c = \frac{n_s}{\sum_{l=0}^{n_s-1} \|\tilde{s}_{l+m\sigma} - \hat{s}_{l+m\sigma}\|^2}$$

where $$\hat{s} = \mathfrak{I}^{-1}\left(\sum_{j=0}^{J_R-1} W_j R_j\right)$$

and wherein $\mathfrak{I}$ represents a Fourier transform operation, wherein $W_j$ represents coefficients of a frequency domain equalizer for a $j^{th}$ receive antenna, wherein $R_j$ represents a received SC-OFDMA symbol over the $j^{th}$ receive antenna, wherein $\tilde{s}_1 = Q[\hat{s}_1]$, and wherein $Q(\ldots)$ is a quantization function which maps a soft symbol to M-ary QAM constellation points.

* * * * *